United States Patent
Gorrell et al.

(10) Patent No.: US 7,573,045 B2
(45) Date of Patent: Aug. 11, 2009

(54) PLASMON WAVE PROPAGATION DEVICES AND METHODS

(75) Inventors: Jonathan Gorrell, Gainesville, FL (US); Jean Tokarz, Hawthorne, FL (US); Michael E. Maines, Gainesville, FL (US); Mark Davidson, Florahome, FL (US)

(73) Assignee: Virgin Islands Microsystems, Inc., St. Thomas, VI (US)

( * ) Notice: Subject to any disclaimer, the term of this patent is extended or adjusted under 35 U.S.C. 154(b) by 237 days.

(21) Appl. No.: 11/798,554

(22) Filed: May 15, 2007

(65) Prior Publication Data
US 2008/0083881 A1 Apr. 10, 2008

Related U.S. Application Data

(60) Provisional application No. 60/801,405, filed on May 19, 2006, provisional application No. 60/800,043, filed on May 15, 2006, provisional application No. 60/812,109, filed on Jun. 9, 2006.

(51) Int. Cl.
*H01J 3/30* (2006.01)
(52) U.S. Cl. .................. 250/399; 250/396 R; 250/397; 329/302; 398/202; 455/313
(58) Field of Classification Search ............ 250/396 R, 250/397, 399, 472.1, 492.1, 492.3; 977/949, 977/950, 951; 385/14, 15; 329/302, 306, 329/323, 346, 358; 398/202, 204, 207; 455/313, 455/315, 318, 323, 325, 329
See application file for complete search history.

(56) References Cited

U.S. PATENT DOCUMENTS 1,948,384 A 2/1934 Lawrence
2,307,086 A 1/1943 Varian et al.
2,397,905 A 4/1946 Acton et al.

(Continued)

FOREIGN PATENT DOCUMENTS

EP 0237559 B1 12/1991

(Continued)

OTHER PUBLICATIONS

U.S. Appl. No. 11/418,082, filed May 5, 2006, Gorrell et al.

(Continued)

*Primary Examiner*—David A Vanore
*Assistant Examiner*—Michael Maskell
(74) *Attorney, Agent, or Firm*—Davidson Berquist Jackson & Gowdey LLP

(57) ABSTRACT

Nanoantennas are formed on a substrate (e.g., silicon) and generate light via interactions with a charged particle beam, where the frequency of the generated light is based in large part on the periodicity of the "fingers" that make up the nanoantennas. Each finger has typical dimensions of less than 100 nm on the shorter side and typically less than 500 nm on the longer, but the size of the optimal longer side is determined by the electron velocity. The charged particle may be an electron beam or any other source of charged particles. By utilizing fine-line lithography on the surface of the substrate, the nanoantennas can be formed without the need for complicated silicon devices.

9 Claims, 6 Drawing Sheets

U.S. PATENT DOCUMENTS

| | | |
|---|---|---|
| 2,431,396 A | 11/1947 | Hansell |
| 2,473,477 A | 6/1949 | Smith |
| 2,634,372 A | 4/1953 | Winfield |
| 2,932,798 A | 4/1960 | Kerst et al. |
| 2,944,183 A | 7/1960 | Drexler |
| 2,966,611 A | 12/1960 | Sandstrom |
| 3,231,779 A | 1/1966 | White |
| 3,315,117 A | 4/1967 | Udelson |
| 3,387,169 A | 6/1968 | Farney |
| 3,543,147 A | 11/1970 | Kovarik |
| 3,546,524 A | 12/1970 | Stark |
| 3,560,694 A | 2/1971 | White |
| 3,571,642 A | 3/1971 | Westcott |
| 3,586,899 A | 6/1971 | Fleisher |
| 3,761,828 A | 9/1973 | Pollard et al. |
| 3,886,399 A | 5/1975 | Symons |
| 3,923,568 A | 12/1975 | Bersin |
| 3,989,347 A | 11/1976 | Eschler |
| 4,053,845 A | 10/1977 | Gould |
| 4,282,436 A | 8/1981 | Kapetanakos |
| 4,450,554 A | 5/1984 | Steensma et al. |
| 4,482,779 A | 11/1984 | Anderson |
| 4,528,659 A | 7/1985 | Jones, Jr. |
| 4,589,107 A | 5/1986 | Middleton et al. |
| 4,598,397 A | 7/1986 | Nelson et al. |
| 4,630,262 A | 12/1986 | Callens et al. |
| 4,652,703 A | 3/1987 | Lu et al. |
| 4,661,783 A | 4/1987 | Gover et al. |
| 4,704,583 A | 11/1987 | Gould |
| 4,712,042 A | 12/1987 | Hamm |
| 4,713,581 A | 12/1987 | Haimson |
| 4,727,550 A * | 2/1988 | Chang et al. .................. 372/2 |
| 4,740,963 A | 4/1988 | Eckley |
| 4,740,973 A | 4/1988 | Madey |
| 4,746,201 A | 5/1988 | Gould |
| 4,761,059 A | 8/1988 | Yeh et al. |
| 4,782,485 A | 11/1988 | Gollub |
| 4,789,945 A | 12/1988 | Niijima |
| 4,806,859 A | 2/1989 | Hetrick |
| 4,809,271 A | 2/1989 | Kondo et al. |
| 4,813,040 A | 3/1989 | Futato |
| 4,819,228 A | 4/1989 | Baran et al. |
| 4,829,527 A | 5/1989 | Wortman et al. |
| 4,838,021 A | 6/1989 | Beattie |
| 4,841,538 A | 6/1989 | Yanabu et al. |
| 4,864,131 A | 9/1989 | Rich et al. |
| 4,866,704 A | 9/1989 | Bergman |
| 4,866,732 A | 9/1989 | Carey et al. |
| 4,873,715 A | 10/1989 | Shibata |
| 4,887,265 A | 12/1989 | Felix |
| 4,890,282 A | 12/1989 | Lambert et al. |
| 4,898,022 A | 2/1990 | Yumoto et al. |
| 4,912,705 A | 3/1990 | Paneth et al. |
| 4,932,022 A | 6/1990 | Keeney et al. |
| 4,981,371 A | 1/1991 | Gurak et al. |
| 5,023,563 A | 6/1991 | Harvey et al. |
| 5,036,513 A | 7/1991 | Greenblatt |
| 5,065,425 A | 11/1991 | Lecomte et al. |
| 5,113,141 A | 5/1992 | Swenson |
| 5,121,385 A | 6/1992 | Tominaga et al. |
| 5,127,001 A | 6/1992 | Steagall et al. |
| 5,128,729 A | 7/1992 | Alonas et al. |
| 5,130,985 A | 7/1992 | Kondo et al. |
| 5,150,410 A | 9/1992 | Bertrand |
| 5,155,726 A | 10/1992 | Spinney et al. |
| 5,157,000 A | 10/1992 | Elkind et al. |
| 5,163,118 A | 11/1992 | Lorenzo et al. |
| 5,185,073 A | 2/1993 | Bindra |
| 5,187,591 A | 2/1993 | Guy et al. |
| 5,199,918 A | 4/1993 | Kumar |
| 5,214,650 A | 5/1993 | Renner et al. |
| 5,233,623 A | 8/1993 | Chang |
| 5,235,248 A | 8/1993 | Clark et al. |
| 5,262,656 A | 11/1993 | Blondeau et al. |
| 5,263,043 A | 11/1993 | Walsh |
| 5,268,693 A | 12/1993 | Walsh |
| 5,268,788 A | 12/1993 | Fox et al. |
| 5,282,197 A | 1/1994 | Kreitzer |
| 5,283,819 A | 2/1994 | Glick et al. |
| 5,293,175 A | 3/1994 | Hemmie et al. |
| 5,302,240 A | 4/1994 | Hori et al. |
| 5,305,312 A | 4/1994 | Fornek et al. |
| 5,341,374 A | 8/1994 | Lewen et al. |
| 5,354,709 A | 10/1994 | Lorenzo et al. |
| 5,446,814 A | 8/1995 | Kuo et al. |
| 5,504,341 A | 4/1996 | Glavish |
| 5,578,909 A | 11/1996 | Billen |
| 5,604,352 A | 2/1997 | Schuetz |
| 5,608,263 A | 3/1997 | Drayton et al. |
| 5,663,971 A | 9/1997 | Carlsten |
| 5,666,020 A | 9/1997 | Takemura |
| 5,668,368 A | 9/1997 | Sakai et al. |
| 5,705,443 A | 1/1998 | Stauf et al. |
| 5,737,458 A | 4/1998 | Wojnarowski et al. |
| 5,744,919 A | 4/1998 | Mishin et al. |
| 5,757,009 A | 5/1998 | Walstrom |
| 5,767,013 A | 6/1998 | Park |
| 5,780,970 A | 7/1998 | Singh et al. |
| 5,790,585 A | 8/1998 | Walsh |
| 5,811,943 A | 9/1998 | Mishin et al. |
| 5,821,836 A | 10/1998 | Katehi et al. |
| 5,821,902 A | 10/1998 | Keen |
| 5,825,140 A | 10/1998 | Fujisawa |
| 5,831,270 A | 11/1998 | Nakasuji |
| 5,847,745 A | 12/1998 | Shimizu et al. |
| 5,889,449 A | 3/1999 | Fiedziuszko |
| 5,889,797 A | 3/1999 | Nguyen |
| 5,902,489 A | 5/1999 | Yasuda et al. |
| 5,963,857 A | 10/1999 | Greywall |
| 6,005,347 A | 12/1999 | Lee |
| 6,008,496 A | 12/1999 | Winefordner et al. |
| 6,040,625 A | 3/2000 | Ip |
| 6,060,833 A | 5/2000 | Velazco |
| 6,080,529 A | 6/2000 | Ye et al. |
| 6,139,760 A | 10/2000 | Shim et al. |
| 6,180,415 B1 | 1/2001 | Schultz et al. |
| 6,195,199 B1 | 2/2001 | Yamada |
| 6,222,866 B1 | 4/2001 | Seko |
| 6,278,239 B1 | 8/2001 | Caporaso et al. |
| 6,281,769 B1 | 8/2001 | Fiedziuszko |
| 6,297,511 B1 | 10/2001 | Syllaios et al. |
| 6,301,041 B1 | 10/2001 | Yamada |
| 6,316,876 B1 | 11/2001 | Tanabe |
| 6,338,968 B1 | 1/2002 | Hefti |
| 6,370,306 B1 | 4/2002 | Sato et al. |
| 6,373,194 B1 | 4/2002 | Small |
| 6,376,258 B2 | 4/2002 | Hefti |
| 6,407,516 B1 | 6/2002 | Victor |
| 6,441,298 B1 | 8/2002 | Thio |
| 6,448,850 B1 | 9/2002 | Yamada |
| 6,453,087 B2 | 9/2002 | Frish et al. |
| 6,470,198 B1 | 10/2002 | Kintaka et al. |
| 6,504,303 B2 | 1/2003 | Small |
| 6,525,477 B2 | 2/2003 | Small |
| 6,534,766 B2 | 3/2003 | Abe et al. |
| 6,545,425 B2 | 4/2003 | Victor |
| 6,552,320 B1 | 4/2003 | Pan |
| 6,577,040 B2 | 6/2003 | Nguyen |
| 6,580,075 B2 | 6/2003 | Kametani et al. |
| 6,603,781 B1 | 8/2003 | Stinson et al. |
| 6,603,915 B2 | 8/2003 | Glebov et al. |
| 6,624,916 B1 | 9/2003 | Green et al. |
| 6,636,185 B1 | 10/2003 | Spitzer et al. |
| 6,636,534 B2 | 10/2003 | Madey et al. |

| Patent No. | Date | Inventor |
|---|---|---|
| 6,636,653 B2 | 10/2003 | Miracky et al. |
| 6,640,023 B2 | 10/2003 | Miller et al. |
| 6,642,907 B2 | 11/2003 | Hamada et al. |
| 6,687,034 B2 | 2/2004 | Wine et al. |
| 6,724,486 B1 | 4/2004 | Shull et al. |
| 6,738,176 B2 | 5/2004 | Rabinowitz et al. |
| 6,741,781 B2 | 5/2004 | Furuyama |
| 6,782,205 B2 | 8/2004 | Trisnadi et al. |
| 6,791,438 B2 | 9/2004 | Takahashi et al. |
| 6,800,877 B2 | 10/2004 | Victor et al. |
| 6,801,002 B2 | 10/2004 | Victor et al. |
| 6,819,432 B2 | 11/2004 | Pepper et al. |
| 6,829,286 B1 | 12/2004 | Guilfoyle et al. |
| 6,834,152 B2 | 12/2004 | Gunn et al. |
| 6,870,438 B1 | 3/2005 | Shino et al. |
| 6,871,025 B2 | 3/2005 | Maleki et al. |
| 6,885,262 B2 | 4/2005 | Nishimura et al. |
| 6,900,447 B2 | 5/2005 | Gerlach et al. |
| 6,909,092 B2 | 6/2005 | Nagahama |
| 6,909,104 B1 | 6/2005 | Koops |
| 6,924,920 B2 | 8/2005 | Zhilkov |
| 6,936,981 B2 | 8/2005 | Gesley |
| 6,943,650 B2 | 9/2005 | Ramprasad et al. |
| 6,944,369 B2 | 9/2005 | Deliwala |
| 6,952,492 B2 | 10/2005 | Tanaka et al. |
| 6,953,291 B2 | 10/2005 | Liu |
| 6,954,515 B2 | 10/2005 | Bjorkholm et al. |
| 6,965,284 B2 | 11/2005 | Maekawa et al. |
| 6,965,625 B2 | 11/2005 | Mross et al. |
| 6,972,439 B1 | 12/2005 | Kim et al. |
| 6,995,406 B2 | 2/2006 | Tojo et al. |
| 7,010,183 B2 | 3/2006 | Estes et al. |
| 7,064,500 B2 | 6/2006 | Victor et al. |
| 7,068,948 B2 | 6/2006 | Wei et al. |
| 7,092,588 B2 | 8/2006 | Kondo |
| 7,092,603 B2 | 8/2006 | Glebov et al. |
| 7,122,978 B2 | 10/2006 | Nakanishi et al. |
| 7,130,102 B2 | 10/2006 | Rabinowitz |
| 7,177,515 B2 | 2/2007 | Estes et al. |
| 7,230,201 B1 | 6/2007 | Miley et al. |
| 7,253,426 B2 | 8/2007 | Gorrell et al. |
| 7,267,459 B2 | 9/2007 | Matheson |
| 7,267,461 B2 | 9/2007 | Kan et al. |
| 7,309,953 B2 | 12/2007 | Tiberi et al. |
| 7,342,441 B2 | 3/2008 | Gorrell et al. |
| 7,362,972 B2 | 4/2008 | Yavor et al. |
| 7,375,631 B2 | 5/2008 | Moskowitz et al. |
| 7,436,177 B2 | 10/2008 | Gorrell et al. |
| 7,442,940 B2 | 10/2008 | Gorrell et al. |
| 7,443,358 B2 | 10/2008 | Gorrell et al. |
| 7,470,920 B2 * | 12/2008 | Gorrell et al. ............ 250/494.1 |
| 7,473,917 B2 | 1/2009 | Singh |
| 2001/0025925 A1 | 10/2001 | Abe et al. |
| 2002/0009723 A1 | 1/2002 | Hefti |
| 2002/0027481 A1 | 3/2002 | Fiedziuszko |
| 2002/0036121 A1 | 3/2002 | Ball et al. |
| 2002/0036264 A1 | 3/2002 | Nakasuji et al. |
| 2002/0053638 A1 | 5/2002 | Winkler et al. |
| 2002/0068018 A1 | 6/2002 | Pepper et al. |
| 2002/0070671 A1 | 6/2002 | Small |
| 2002/0071457 A1 | 6/2002 | Hogan |
| 2002/0135665 A1 | 9/2002 | Gardner |
| 2002/0191650 A1 | 12/2002 | Madey et al. |
| 2003/0010979 A1 | 1/2003 | Pardo |
| 2003/0012925 A1 | 1/2003 | Gorrell |
| 2003/0016412 A1 | 1/2003 | Small |
| 2003/0016421 A1 | 1/2003 | Small |
| 2003/0034535 A1 | 2/2003 | Barenburg et al. |
| 2003/0103150 A1 | 6/2003 | Catrysse et al. |
| 2003/0106998 A1 | 6/2003 | Colbert et al. |
| 2003/0155521 A1 | 8/2003 | Feuerbaum |
| 2003/0158474 A1 | 8/2003 | Scherer et al. |
| 2003/0164947 A1 | 9/2003 | Vaupel |
| 2003/0179974 A1 | 9/2003 | Estes et al. |
| 2003/0206708 A1 | 11/2003 | Estes et al. |
| 2003/0214695 A1 | 11/2003 | Abramson et al. |
| 2004/0061053 A1 | 4/2004 | Taniguchi et al. |
| 2004/0080285 A1 | 4/2004 | Victor et al. |
| 2004/0085159 A1 | 5/2004 | Kubena et al. |
| 2004/0092104 A1 | 5/2004 | Gunn, III et al. |
| 2004/0108471 A1 | 6/2004 | Luo et al. |
| 2004/0108473 A1 | 6/2004 | Melnychuk et al. |
| 2004/0136715 A1 | 7/2004 | Kondo |
| 2004/0150991 A1 | 8/2004 | Ouderkirk et al. |
| 2004/0171272 A1 | 9/2004 | Jin et al. |
| 2004/0180244 A1 | 9/2004 | Tour et al. |
| 2004/0184270 A1 | 9/2004 | Halter |
| 2004/0213375 A1 | 10/2004 | Bjorkholm et al. |
| 2004/0217297 A1 | 11/2004 | Moses et al. |
| 2004/0218651 A1 | 11/2004 | Iwasaki et al. |
| 2004/0231996 A1 | 11/2004 | Webb |
| 2004/0240035 A1 | 12/2004 | Zhilkov |
| 2004/0264867 A1 | 12/2004 | Kondo |
| 2005/0023145 A1 | 2/2005 | Cohen et al. |
| 2005/0045821 A1 | 3/2005 | Noji et al. |
| 2005/0045832 A1 | 3/2005 | Kelly et al. |
| 2005/0054151 A1 | 3/2005 | Lowther et al. |
| 2005/0067286 A1 | 3/2005 | Ahn et al. |
| 2005/0082469 A1 | 4/2005 | Carlo |
| 2005/0092929 A1 | 5/2005 | Schneiker |
| 2005/0104684 A1 | 5/2005 | Wojcik |
| 2005/0105690 A1 | 5/2005 | Pau et al. |
| 2005/0145882 A1 | 7/2005 | Taylor et al. |
| 2005/0152635 A1 | 7/2005 | Paddon et al. |
| 2005/0162104 A1 | 7/2005 | Victor et al. |
| 2005/0190637 A1 | 9/2005 | Ichimura et al. |
| 2005/0194258 A1 | 9/2005 | Cohen et al. |
| 2005/0201707 A1 | 9/2005 | Glebov et al. |
| 2005/0201717 A1 | 9/2005 | Matsumura et al. |
| 2005/0212503 A1 | 9/2005 | Deibele |
| 2005/0231138 A1 | 10/2005 | Nakanishi et al. |
| 2005/0249451 A1 | 11/2005 | Baehr-Jones et al. |
| 2005/0285541 A1 | 12/2005 | LeChevalier |
| 2006/0007730 A1 | 1/2006 | Nakamura et al. |
| 2006/0018619 A1 | 1/2006 | Helffrich et al. |
| 2006/0035173 A1 | 2/2006 | Davidson et al. |
| 2006/0045418 A1 | 3/2006 | Cho et al. |
| 2006/0050269 A1 | 3/2006 | Brownell |
| 2006/0060782 A1 | 3/2006 | Khursheed |
| 2006/0062258 A1 | 3/2006 | Brau et al. |
| 2006/0131695 A1 | 6/2006 | Kuekes et al. |
| 2006/0159131 A1 | 7/2006 | Liu et al. |
| 2006/0164496 A1 | 7/2006 | Tokutake et al. |
| 2006/0187794 A1 | 8/2006 | Harvey et al. |
| 2006/0208667 A1 | 9/2006 | Lys et al. |
| 2006/0216940 A1 | 9/2006 | Gorrell et al. |
| 2006/0243925 A1 | 11/2006 | Barker et al. |
| 2006/0274922 A1 | 12/2006 | Ragsdale |
| 2007/0003781 A1 | 1/2007 | de Rochemont |
| 2007/0013765 A1 | 1/2007 | Hudson et al. |
| 2007/0075264 A1 | 4/2007 | Gorrell et al. |
| 2007/0086915 A1 | 4/2007 | LeBoeuf et al. |
| 2007/0116420 A1 | 5/2007 | Estes et al. |
| 2007/0146704 A1 | 6/2007 | Schmidt et al. |
| 2007/0152176 A1 | 7/2007 | Gorrell et al. |
| 2007/0154846 A1 * | 7/2007 | Gorrell et al. ................ 430/313 |
| 2007/0194357 A1 | 8/2007 | Oohashi |
| 2007/0200940 A1 | 8/2007 | Gruhlke et al. |
| 2007/0252983 A1 | 11/2007 | Tong et al. |
| 2007/0258689 A1 | 11/2007 | Gorrell et al. |
| 2007/0258690 A1 | 11/2007 | Gorrell et al. |
| 2007/0259641 A1 | 11/2007 | Gorrell |
| 2007/0264023 A1 | 11/2007 | Gorrell et al. |
| 2007/0264030 A1 * | 11/2007 | Gorrell et al. ................ 398/200 |
| 2007/0284527 A1 | 12/2007 | Zani et al. |
| 2008/0069509 A1 | 3/2008 | Gorrell et al. |

2008/0302963 A1    12/2008  Nakasuji et al.

FOREIGN PATENT DOCUMENTS

| JP | 2004-32323 A | 1/2004 |
|---|---|---|
| WO | WO 87/01873 | 3/1987 |
| WO | WO 93/21663 A1 | 10/1993 |
| WO | WO 2000/072413 | 11/2000 |
| WO | WO 02/025785 | 3/2002 |
| WO | WO 02/077607 | 10/2002 |
| WO | WO 2004/086560 | 10/2004 |
| WO | WO 2005/015143 A2 | 2/2005 |
| WO | WO 2005/098966 | 10/2005 |
| WO | WO 2006/042239 A2 | 4/2006 |
| WO | WO 2007/081389 | 7/2007 |
| WO | WO 2007/081390 | 7/2007 |
| WO | WO 2007/081391 | 7/2007 |

OTHER PUBLICATIONS

"An Early History—Invention of the Klystron," http://varianinc.com/sgi-bin/advprint/print.cgi?cid=KLQNPPJJFJ, printed on Dec. 26, 2008.

"An Early History—The Founding of Varian Associates," http://varianinc.com/sgi-bin/advprint/print.cgi?cid=KLQNPPJJFJ, printed on Dec. 26, 2008.

"Array of Nanoklystrons for Frequency Agility or Redundancy,"NASA's Jet Propulsion Laboratory, NASA Tech Briefs, NPO-21033. 2001.

"Chapter 3 X-Ray Tube," http://compepid.tuskegee.edu/syllabi/clinical/small/radiology/chapter. . . , printed from tuskegee.edu on Dec. 29, 2008.

"Diagnostic imaging modalities—Ionizing vs non-ionizing radiation," http://info.med.yale.edu/intmed/cardio/imaging/techniques/ionizing_v. . . , printed from Yale University School of Medicine on Dec. 29, 2008.

"Frequently Asked Questions," Luxtera Inc., found at http://www.luxtera.com/technology_faq.htm, printed Dec. 2, 2005, 4 pages.

"Hardware Development Programs," Calabazas Creek Research, Inc. found at http://calcreek.com/hardware.html.

"Klystron Amplifier," http://www.radartutorial.eu/08.transmitters/tx12.en.html, printed on Dec. 26, 2008.

"Klystron is a Micowave Generator," http://www2.slac.stanford.edu/vvc/accelerators/klystron.html, printed on Dec. 26, 2008.

"Klystron," http:en.wikipedia.org/wiki/Klystron, printed on Dec. 26, 2008.

"Making X-rays," http://www.fnrfscience.cmu.ac.th/theory/radiation/xray-basics.html, printed on Dec. 29, 2008.

"Microwave Tubes," http://www.tpub.com/neets/book11/45b.htm, printed on Dec. 26, 2008.

"Notice of Allowability" mailed on Jan. 17, 2008 in U.S. Appl. No. 11/418,082 filed May 5, 2006.

"Technology Overview," Luxtera, Inc., found at http:www.luxtera.com/technology.htm, printed on Dec. 2, 2005, 1 page.

"The Reflex Klystron," http://www.fnrfscience.cmu.ac.th/theory/microwave%2, printed from Fast Netoron Research Facilty on Dec. 26, 2008.

"x-ray tube," http://www.answers.com/topic/x-ray-tube, printed on Dec. 29, 2008.

"Antenna Arrays," May 18, 2002. www.tpub.com/content/neets/14183/css/14183_159.htm.

"Diffraction Grating," hyperphysics.phy-astr.gsu.edu/hbase/phyopt/grating.html.

Mar. 24, 2006 PTO Office Action in U.S. Appl. No. 10/917,511.
Mar. 25, 2008 PTO Office Action in U.S. Appl. No. 11/411,131.
Apr. 8, 2008 PTO Office Action in U.S. Appl. No. 11/325,571.
Apr. 17, 2008 Response to PTO Office Action of Dec. 20, 2007 in U.S. Appl. No. 11/418,087.
Apr. 19, 2007 Response to PTO Office Action of Jan. 17, 2007 in U.S. Appl. No. 11/418,082.
May 10, 2005 PTO Office Action in U.S. Appl. No. 10/917,511.
May 21, 2007 PTO Office Action in U.S. Appl. No. 11/418,087.
May 26, 2006 Response to PTO Office Action of Mar. 24, 2006 in U.S. Appl. No. 10/917,511.
Jun. 16, 2008 Response to PTO Office Action of Dec. 14, 2007 in U.S. Appl. No. 11/418,264.
Jun. 20, 2008 Response to PTO Office Action of Mar. 25, 2008 in U.S. Appl. No. 11/411,131.
Aug. 14, 2006 PTO Office Action in U.S. Appl. No. 10/917,511.
Sep. 1, 2006 Response to PTO Office Action of Aug. 14, 2006 in U.S. Appl. No. 10,917,511.
Sep. 12, 2005 Response to PTO Office Action of May 10, 2005 in U.S. Appl. No. 10,917,511.
Sep. 14, 2007 PTO Office Action in U.S. Appl. No. 11/411,131.
Oct. 19, 2007 Response to PTO Office Action of May 21, 2007 in U.S. Appl. No. 11/418,087.
Dec. 4, 2006 PTO Office Action in U.S. Appl. No. 11/418,087.
Dec. 14, 2007 PTO Office Action in U.S. Appl. No. 11/418,264.
Dec. 14, 2007 Response to PTO Office Action of Sep. 14, 2007 in U.S. Appl. No. 11/411,131.
Dec. 20, 2007 PTO Office Action in U.S. Appl. No. 11/418,087.

Alford, T.L. et al., "Advanced silver-based metallization patterning for ULSI applications," Microelectronic Engineering 55, 2001, pp. 383-388, Elsevier Science B.V.

Amato, Ivan, "An Everyman's Free-Electron Laser?" Science, New Series, Oct. 16, 1992, p. 401, vol. 258 No. 5081, American Association for the Advancement of Science.

Andrews, H.L. et al., "Dispersion and Attenuation in a Smith-Purcell Free Electron Laser," The American Physical Society, Physical Review Special Topics - Accelerators and Beams 8 (2005), pp. 050703-1-050703-9.

Backe, H. et al. "Investigation of Far-Infrared Smith-Purcell Radiation at the 3.41 MeV Electron Injector Linac of the Mainz Microtron MAMI," Institut fur Kernphysik, Universitat Mainz, D-55099, Mainz Germany.

Bakhtyari, A. et al., "Horn Resonator Boosts Miniature Free-Electron Laser Power," Applied Physics Letters, May 12, 2003, pp. 3150-3152, vol. 82, No. 19, American Institute of Physics.

Bakhtyari, Dr. Arash, "Gain Mechanism in a Smith-Purcell MicroFEL," Abstract, Department of Physics and Astronomy, Dartmouth College.

Bhattacharjee, Sudeep et al., "Folded Waveguide Traveling-Wave Tube Sources for Terahertz Radiation." IEEE Transactions on Plasma Science, vol. 32, No. 3, Jun. 2004, pp. 1002-1014.

Booske, J.H. et al., "Microfabricated TWTs as High Power, Wideband Sources of THz Radiation".

Brau, C.A. et al., "Gain and Coherent Radiation from a Smith-Purcell Free Electron Laser," Proceedings of the 2004 FEL Conference, pp. 278-281.

Brownell, J.H. et al., "Improved μFEL Performance with Novel Resonator," Jan. 7, 2005, from website: www.frascati.enea.it/thz-bridge/workshop/presentations/Wednesday/We-07-Brownell.ppt.

Brownell, J.H. et al., "The Angular Distribution of the Power Produced by Smith-Purcell Radiation," J. Phys. D: Appl. Phys. 1997, pp. 2478-2481, vol. 30, IOP Publishing Ltd., United Kingdom.

Chuang, S.L. et al., "Enhancement of Smith-Purcell Radiation from a Grating with Surface-Plasmon Excitation," Journal of the Optical Society of America, Jun. 1984, pp. 672-676, vol. 1 No. 6, Optical Society of America.

Chuang, S.L. et al., "Smith-Purcell Radiation from a Charge Moving Above a Penetrable Grating," IEEE MTT-S Digest, 1983, pp. 405-406, IEEE.

Corcoran, Elizabeth, "Ride the Light," Forbes Magazine, Apr. 11, 2005, pp. 68-70.

European Search Report mailed Mar. 3, 2009 in European Application No. 06852028.7.

Far-IR, Sub-MM & MM Detector Technology Workshop list of manuscripts, session 6 2002.

Feltz, W.F. et al., "Near-Continuous Profiling of Temperature, Moisture, and Atmospheric Stability Using the Atmospheric Emitted Radiance Interferometer (AERI)," Journal of Applied Meteorology, May 2003, vol. 42, No. 5, H.W. Wilson Company, pp. 584-597.

Freund, H.P. et al., "Linearized Field Theory of a Smith-Purcell Traveling Wave Tube," IEEE Transactions on Plasma Science, Jun. 2004, pp. 1015-1027, vol. 32 No. 3, IEEE.

Gallerano, G.P. et al., "Overview of Terahertz Radiation Sources," Proceedings of the 2004 FEL Conference, pp. 216-221.

Goldstein, M. et al., "Demonstration of a Micro Far-Infrared Smith-Purcell Emitter," Applied Physics Letters, Jul. 28, 1997, pp. 452-454, vol. 71 No. 4, American Institute of Physics.

Gover, A. et al., "Angular Radiation Pattern of Smith-Purcell Radiation," Journal of the Optical Society of America, Oct. 1984, pp. 723-728, vol. 1 No. 5, Optical Society of America.

Grishin, Yu, A. et al., "Pulsed Orotron - A New Microwave Source for Submillimeter Pulse High-Field Electron Paramagnetic Resonance Spectroscopy," Review of Scientific Instruments, Sep. 2004, pp. 2926-2936, vol. 75 No. 9, American Institute of Physics.

International Search Report and Written Opinion mailed Nov. 23, 2007 in International Application No. PCT/US2006/022786.

Ishizuka, H. et al., "Smith-Purcell Experiment Utilizing a Field-Emitter Array Cathode: Measurements of Radiation," Nuclear Instruments and Methods in Physics Research, 2001 pp. 593-598, A 475, Elsevier Science B.V.

Ishizuka, H. et al., "Smith-Purcell Experiment Using a Field-Emission Array Cathode," Nuclear Instruments and Methods in Physics Research, 2000 pp. 276-280, A 445, Elsevier Science B.V.

Ives, Lawrence et al., "Development of Backward Wave Oscillators for Terahertz Applications," Terahertz for Military and Security Application, Proceedings of SPIE vol. 5070 (2003), pp. 71-82.

Ives, R. Lawrence, "IVEC Summary, Session 2, Sources I" 2002.

J. C. Palais, "Fiber optic communications," Prentice Hall, New Jersey, 1998, pp. 156-158.

Jonietz, Erika, "Nano Antenna Gold nanospheres show path to all-optical computing," Technology Review, Dec. 2005/Jan. 2006, p. 32.

Joo, Youngcheol et al., "Air Cooling of IC Chip with Novel Microchannels Monolithically Formed on Chip Front Surface," Cooling and Thermal Design of Electronic Systems (HTD-vol. 319 & EEP-vol. 15), International Mechanical Engineering Congress and Exposition, San Francisco, CA, Nov. 1995, pp. 117-121.

Joo, Youngcheol et al., "Fabrication on Monolithic Microchannels for IC Chip Cooling," 1995, Mechanical, Aerospace and Nuclear Engineering Department, University of California at Los Angeles.

Jung, K.B. et al., "Patterning of Cu, Co, Fe, and Ag for magnetic nanostructures," J. Vac. Sci. Technol. A 15(3), May/Jun. 1997, pp. 1780-1784.

Kapp, Oscar H. et al., "Modification of a Scanning Electron Microscope to Produce Smith-Purcell Radiation," Review of Scientific Instruments, Nov. 2004, pp. 4732-4741, vol. 75 No. 11, American Institute of Physics.

Kiener, C. et al., "Investigation of the Mean Free Path of Hot Electrons in GaAs/AlGaAs Heterostructures," Semicond. Sci. Technol., 1994, pp. 193-197, vol. 9, IOP Publishing Ltd., United Kingdom.

Kim, Shang Hoon, "Quantum Mechnical Theory of Free-Electron Two-Quantum Stark Emissin Driven by Transverse Motion," Journal of the Physical Society of Japan, Aug. 1993, vol. 62 No. 8, pp. 2528-2532.

Korbly, S.E. et al., "Progress on a Smith-Purcell Radiation Bunch Length Diagnostic," Plasma Science and Fusion Center, MIT, Cambridge, MA.

Kormann, T. et al., "A Photoelectron Source for the Study of Smith-Purcell Radiation".

Kube, G. et al., "Observation of Optical Smith-Purcell Radiation at an Electron Beam Energy of 855 MeV," Physical Review E, May 8, 2002, vol. 65, The Americal Physical Society, pp. 056501-1-056501-15.

Lee Kwang-Cheol et al., "Deep X-Ray Mask with Integrated Actuator for 3D Microfabrication", Conference: Pacific Rim Workshop on Transducers and Micro/Nano Technologies, (Xiamen CHN), Jul. 22, 2002.

Liu, Chuan Sheng, et al., "Stimulated Coherent Smith-Purcell Radiation from a Metallic Grating," IEEE Journal of Quantum Electronics, Oct. 1999, pp. 1386-1389, vol. 35, No. 10, IEEE.

Manohara, Harish et al., "Field Emission Testing Carbon Nanotubes for THz Frequency Vacuum Microtube Sources." Abstract. Dec. 2003, from SPIEWeb.

Manohara, Harish M. et al., "Design and Fabrication of a THz Nanoklystron".

Manohara, Harish M. et al., "Design and Fabrication of a THz Nanoklystron" (www.sofia.ursa.edu/det_workshop/ posters/session 3/3-43manohara_poster.pdf), PowerPoint Presentation.

Markoff, John, "A Chip That Can Transfer Data Using Laser Light," The New York Times, Sep. 18, 2006.

McDaniel, James C. et al., "Smith-Purcell Radiation in the High Conductivity and Plasma Frequency Limits," Applied Optics, Nov. 15, 1989, pp. 4924-4929, vol. 28 No. 22, Optical Society of America.

Meyer, Stephan, "Far IR, Sub-MM & MM Detector Technology Workshop Summary," Oct. 2002. (may date the Manohara documents).

Mokhoff, Nicolas, "Optical-speed light detector promises fast space talk," EETimes Online, Mar. 20, 2006, fom website: www.eetimes.com/showArticle.jhtml?articleID=183701047.

Neo et al., "Smith-Purcell Radiation from Ultraviolet to Infrared Using a Si-field Emitter" Vacuum Electronics Conference, 2007, IVEC '07, IEEE International May 2007.

Nguyen, Phucanh et al., "Novel technique to pattern silver using CF4 and CF4/O2 glow discharges," J.Vac. Sci. Technol. B 19(1), Jan./Feb. 2001, American Vacuum Society, pp. 158-165.

Nguyen, Phucanh et al., "Reactive ion etch of patterned and blanket silver thin films in CI2 and O2 glow discharges," J. Vac. Sci. Technol. B 17(5), Sep./Oct. 1999, American Vacuum Society, pp. 2204-2209.

Ohtaka, Kazuo, "Smith-Purcell Radiation from Metallic and Dielectric Photonic Crystals," Center for Frontier Science, pp. 272-273, Chiba University, 1-33 Yayoi, Inage-ku, Chiba-shi, Japan.

Ossia, Babak, "the X-Ray Production," Department of Biomedical Engineering - University of Rhode Island, 1 page.

Phototonics Research, "Surface-Plasmon-Enhanced Random Laser Demonstrated," Phototonics Spectra, Feb. 2005, pp. 112-113.

Platt, C.L. et al., "A New Resonator Design for Smith-Purcell Free Electron Lasers," 6Q19, p. 296.

Potylitsin, A.P., "Resonant Diffraction Radiation and Smith-Purcell Effect," (Abstract), arXiv: physics/9803043 v2 Apr. 13, 1998.

Potylitsin, A.P., "Resonant Diffraction Radiation and Smith-Purcell Effect," Physics Letters A, Feb. 2, 1998, pp. 112-116, A 238, Elsevier Science B.V.

S. Hoogland et al., "A Solution-processed 1.53 µm quantum dot laser with temperature-invariant emission wavelength," Optics Express, vol. 14, No. 8, Apr. 17, 2006, pp. 3273-3281.

S.M. Sze, "Semiconductor Devices Physics and Technology", 2nd Edition, Chapters 9 and 12, Copyright 1985, 2002.

Sadwick, Larry et al., "Microfabricated next-generation millimeter-wave power amplifiers," www.rfdesign.com.

Saraph, Girish P. et al., "Design of a Single-Stage Depressed Collector for High-Power, Pulsed Gyroklystrom Amplifiers," IEEE Transactions on Electron Devices, vol. 45, No. 4, Apr. 1998, pp. 986-990.

Sartori, Gabriele, "CMOS PHOTONICS Platform", Luxtera, Inc., Nov. 2005, 19 pages.

Savilov, Andrey V., "Stimulated Wave Scattering in the Smith-Purcell FEL," IEEE Transactions on Plasma Science, Oct. 2001, pp. 820-823, vol. 29 No. 5, IEEE.

Schachter, Levi et al., "Smith-Purcell Oscillator in an Exponential Gain Regime," Journal of Applied Physics, Apr. 15, 1989, pp. 3267-3269, vol. 65 No. 8, American Institute of Physics.

Schachter, Levi, "Influence of the Guiding Magnetic Field on the Performance of a Smith-Purcell Amplifier Operating in the Weak Compton Regime," Journal of the Optical Society of America, May 1990, pp. 873-876, vol. 7 No. 5, Optical Society of America.

Schachter, Levi, "The Influence of the Guiding Magnetic Field on the Performance of a Smith-Purcell Amplifier Operating in the Strong Compton Regime," Journal of Applied Physics, Apr. 15, 1990, pp. 3582-3592, vol. 67 No. 8, American Institute of Physics.

Search Report and Writen Opinion mailed Jul. 14, 2008 in PCT Appln. No. PCT/US2006/022773.

Search Report and Written Opinion mailed Apr. 23, 2008 in PCT Appln. No. PCT/US2006/022678.

Search Report and Written Opinion mailed Apr. 3, 2008 in PCT Appln. No. PCT/US2006/027429.

Search Report and Written Opinion mailed Aug. 19, 2008 in PCT Appln. No. PCT/US2007/008363.

Search Report and Written Opinion mailed Aug. 24, 2007 in PCT Appln. No. PCT/US2006/022768.

Search Report and Written Opinion mailed Aug. 31, 2007 in PCT Appln. No. PCT/US2006/022680.

Search Report and Written Opinion mailed Dec. 20, 2007 in PCT Appln. No. PCT/US2006/022771.
Search Report and Written Opinion mailed Feb. 12, 2007 in PCT Appln. No. PCT/US2006/022682.
Search Report and Written Opinion mailed Feb. 20, 2007 in PCT Appln. No. PCT/US2006/022676.
Search Report and Written Opinion mailed Feb. 20, 2007 in PCT Appln. No. PCT/US2006/022772.
Search Report and Written Opinion mailed Feb. 20, 2007 in PCT Appln. No. PCT/US2006/022780.
Search Report and Written Opinion mailed Feb. 21, 2007 in PCT Appln. No. PCT/US2006/022684.
Search Report and Written Opinion mailed Jan. 17, 2007 in PCT Appln. No. PCT/US2006/022777.
Search Report and Written Opinion mailed Jan. 23, 2007 in PCT Appln. No. PCT/US2006/022781.
Search Report and Written Opinion mailed Jan. 31, 2008 in PCT Appln. No. PCT/US2006/027427.
Search Report and Written Opinion mailed Jan. 8, 2008 in PCT Appln. No. PCT/US2006/028741.
Search Report and Written Opinion mailed Jul. 16, 2007 in PCT Appln. No. PCT/US2006/022774.
Search Report and Written Opinion mailed Jul. 16, 2008 in PCT Appln. No. PCT/US2006/022766.
Search Report and Written Opinion mailed Jul. 20, 2007 in PCT Appln. No. PCT/US2006/024216.
Search Report and Written Opinion mailed Jul. 26, 2007 in PCT Appln. No. PCT/US2006/022776.
Search Report and Written Opinion mailed Jul. 28, 2008 in PCT Appln. No. PCT/US2006/022782.
Search Report and Written Opinion mailed Jul. 3, 2008 in PCT Appln. No. PCT/US2006/022690.
Search Report and Written Opinion mailed Jul. 3, 2008 in PCT Appln. No. PCT/US2006/022778.
Search Report and Written Opinion mailed Jul. 7, 2008 in PCT Appln. No. PCT/US2006/022686.
Search Report and Written Opinion mailed Jul. 7, 2008 in PCT Appln. No. PCT/US2006/022785.
Search Report and Written Opinion mailed Jun. 18, 2008 in PCT Appln. No. PCT/US2006/027430.
Search Report and Written Opinion mailed Jun. 20, 2007 in PCT Appln. No. PCT/US2006/022779.
Search Report and Written Opinion mailed Jun. 3, 2008 in PCT Appln. No. PCT/US2006/022783.
Search Report and Written Opinion mailed Mar. 11, 2008 in PCT Appln. No. PCT/US2006/022679.
Search Report and Written Opinion mailed Mar. 24, 2008 in PCT Appln. No. PCT/US2006/022677.
Search Report and Written Opinion mailed Mar. 24, 2008 in PCT Appln. No. PCT/US2006/022784.
Search Report and Written Opinion mailed Mar. 7, 2007 in PCT Appln. No. PCT/US2006/022775.
Search Report and Written Opinion mailed May 2, 2008 in PCT Appln. No. PCT/US2006/023280.
Search Report and Written Opinion mailed May 21, 2008 in PCT Appln. No. PCT/US2006/023279.
Search Report and Written Opinion mailed May 22, 2008 in PCT Appln. No. PCT/US2006/022685.
Search Report and Written Opinion mailed Oct. 25, 2007 in PCT Appln. No. PCT/US2006/022687.
Search Report and Written Opinion mailed Oct. 26, 2007 in PCT Appln. No. PCT/US2006/022675.
Search Report and Written Opinion mailed Sep. 12, 2007 in PCT Appln. No. PCT/US2006/022767.
Search Report and Written Opinion mailed Sep. 13, 2007 in PCT Appln. No. PCT/US2006/024217.
Search Report and Written Opinion mailed Sep. 17, 2007 in PCT Appln. No. PCT/US2006/022689.
Search Report and Written Opinion mailed Sep. 17, 2007 in PCT Appln. No. PCT/US2006/022787.
Search Report and Written Opinion mailed Sep. 2, 2008 in PCT Appln. No. PCT/US2006/022769.
Search Report and Written Opinion mailed Sep. 21, 2007 in PCT Appln. No. PCT/US2006/022688.
Search Report and Written Opinion mailed Sep. 25, 2007 in PCT Appln. No. PCT/US2006/022681.
Search Report and Written Opinion mailed Sep. 26, 2007 in PCT Appln. No. PCT/US2006/024218.
Search Report and Written Opinion mailed Sep. 26, 2008 in PCT Appln. No. PCT/US2007/00053.
Search Report and Written Opinion mailed Sep. 3, 2008 in PCT Appln. No. PCT/US2006/022770.
Search Report and Written Opinion mailed Sep. 5, 2007 in PCT Appln. No. PCT/US2006/027428.
Shih, I. et al.,"Experimental Investigations of Smith-Purcell Radiation," Journal of the Optical Society of America, Mar. 1990, pp. 351-356, vol. 7, No. 3, Optical Society of America.
Shih, I. et al.,"Measurements of Smith-Purcell Radiation," Journal of the Optical Society of America, Mar. 1990, pp. 345-350, vol. 7, No. 3, Optical Society of America.
Speller et al., "A Low-Noise MEMS Accelerometer for Unattended Ground Sensor Applications", Applied MEMS Inc., 12200 Parc Crest, Stafford, TX, USA 77477.
Swartz, J.C. et al., "THz-FIR Grating Coupled Radiation Source," Plasma Science, 1998, 1D02, p. 126.
Temkin, Richard, "Scanning with Ease Through the Far Infrared," Science, New Series, May 8, 1998, p. 854, vol. 250, No. 5365, American Association for the Advancement of Science.
Thumm, Manfred, "Historical German Contributions to Physics and Applications of Electromagnetic Oscillations and Waves."
Thurn-Albrecht et al., "Ultrahigh-Density Nanowire Arrays Grown in Self-Assembled Diblock Copolymer Templates", Science 290. 5499, Dec. 15, 2000, pp. 2126-2129.
U.S. Appl. No. 11/203,407 - Nov. 13, 2008 PTO Office Action.
U.S. Appl. No. 11/238,991 - Dec. 6, 2006 PTO Office Action.
U.S. Appl. No. 11/238,991 - Jun. 6, 2007 Response to PTO Office Action of Dec. 6, 2006.
U.S. Appl. No. 11/238,991 - Sep. 10, 2007 PTO Office Action.
U.S. Appl. No. 11/238,991 - Mar. 6, 2008 Response to PTO Office Action of Sep. 10, 2007.
U.S. Appl. No. 11/239,991 - Mar. 27, 2008 PTO Office Action.
U.S. Appl. No. 11/239,991 - Dec. 12, 2008 Response to PTO Office Action of Jun. 27, 2008.
U.S. Appl. No. 11/239,991 - Mar. 24, 2009 PTO Office Action.
U.S. Appl. No. 11/243,477 - Apr. 25, 2008 PTO Office Action.
U.S. Appl. No. 11/243,477 - Oct. 24, 2008 Response to PTO Office Action of Apr. 25, 2008.
U.S. Appl. No. 11/243,477 - Jan. 7, 2009 PTO Office Action.
U.S. Appl. No. 11/325,448 - Jun. 16, 2008 PTO Office Action.
U.S. Appl. No. 11/325,448 - Dec. 16, 2008 Response to PTO Office Action of Jun. 16, 2008.
U.S. Appl. No. 11/325,534 - Jun. 11, 2008 PTO Office Action.
U.S. Appl. No. 11/325,534 - Oct. 15, 2008 Response to PTO Office Action of Jun. 11, 2008.
U.S. Appl. No. 11/353,208 - Jan. 15, 2008 PTO Office Action.
U.S. Appl. No. 11/353,208 - Mar. 17, 2008 PTO Office Action.
U.S. Appl. No. 11/353,208 - Sep. 15, 2008 Response to PTO Office Action of Mar. 17, 2008.
U.S. Appl. No. 11/353,208 - Dec. 24, 2008 PTO Office Action.
U.S. Appl. No. 11/353,208 - Dec. 30, 2008 Response to PTO Office Action of Dec. 24, 2008.
U.S. Appl. No. 11/400,280 - Oct. 16, 2008 PTO Office Action.
U.S. Appl. No. 11/400,280 - Oct. 24, 2008 Response to PTO Office Action of Oct. 16, 2008.
U.S. Appl. No. 11/410,905 - Sep. 26, 2008 PTO Office Action.
U.S. Appl. No. 11/410,905 - Mar. 26, 2009 Response to PTO Office Action of Sep. 26, 2008.
U.S. Appl. No. 11/410,924 - Mar. 6, 2009 PTO Office Action.
U.S. Appl. No. 11/411,120 - Mar. 19, 2009 PTO Office Action.
U.S. Appl. No. 11/411,129 - Jan. 16, 2009 Office Action.
U.S. Appl. No. 11/411,130 - May 1, 2008 PTO Office Action.
U.S. Appl. No. 11/411,130 - Oct. 29, 2008 Response to PTO Office Action of May 1, 2008.
U.S. Appl. No. 11/417,129 - Jul. 11, 2007 PTO Office Action.

U.S. Appl. No. 11/417,129 - Dec. 17, 2007 Response to PTO Office Action of Jul. 11, 2007.
U.S. Appl. No. 11/417,129 - Dec. 20, 2007 Response to PTO Office Action of Jul. 11, 2007.
U.S. Appl. No. 11/417,129 - Apr. 17, 2008 PTO Office Action.
U.S. Appl. No. 11/417,129 - Jun. 19, 2008 Response to PTO Office Action of Apr. 17, 2008.
U.S. Appl. No. 11/418,079 - Apr. 11, 2008 PTO Office Action.
U.S. Appl. No. 11/418,079 - Oct. 7, 2008 Response to PTO Office Action of Apr. 11, 2008.
U.S. Appl. No. 11/418,079 - Feb. 12, 2009 PTO Office Action.
U.S. Appl. No. 11/418,080 - Mar. 18, 2009 PTO Office Action.
U.S. Appl. No. 11/418,082 - Jan. 17, 2007 PTO Office Action.
U.S. Appl. No. 11/418,083 - Jun. 20, 2008-2008 PTO Office Action.
U.S. Appl. No. 11/418,083 - Dec. 18, 2008 Response to PTO Office Action of Jun. 20, 2008.
U.S. Appl. No. 11/418,084 - Nov. 5, 2007 PTO Office Action.
U.S. Appl. No. 11/418,084 - May 5, 2008 Response to PTO Office Action of Nov. 5, 2007.
U.S. Appl. No. 11/418,084 - Aug. 19, 2008 PTO Office Action.
U.S. Appl. No. 11/418,084 - Feb. 19, 2009 Response to PTO Office Action of Aug. 19, 2008.
U.S. Appl. No. 11/418,085 - Aug. 10, 2007 PTO Office Action.
U.S. Appl. No. 11/418,085 - Nov. 13, 2007 Response to PTO Office Action of Aug. 10, 2007.
U.S. Appl. No. 11/418,085 - Feb. 12, 2008 PTO Office Action.
U.S. Appl. No. 11/418,085 - Aug. 12, 2008 Response to PTO Office Action of Feb. 12, 2008.
U.S. Appl. No. 11/418,085 - Sep. 16, 2008 PTO Office Action.
U.S. Appl. No. 11/418,085 - Mar. 6, 2009 Response to PTO Office Action of Sep. 16, 2008.
U.S. Appl. No. 11/418,087 - Dec. 29, 2006 Response to PTO Office Action of Dec. 4, 2006.
U.S. Appl. No. 11/418,087 - Feb. 15, 2007 PTO Office Action.
U.S. Appl. No. 11/418,087 - Mar. 6, 2007 Response to PTO Office Action of Feb. 15, 2007.
U.S. Appl. No. 11/418,088 - Jun. 9, 2008 PTO Office Action.
U.S. Appl. No. 11/418,088 - Dec. 8, 2008 Response to PTO Office Action of Jun. 9, 2008.
U.S. Appl. No. 11/418,089 - Mar. 21, 2008 PTO Office Action.
U.S. Appl. No. 11/418,089 - Jun. 23, 2008 Response to PTO Office Action of Mar. 21, 2008.
U.S. Appl. No. 11/418,089 - Sep. 30, 2008 PTO Office Action.
U.S. Appl. No. 11/418,089 - Mar. 30, 2009 Response to PTO Office Action of Sep. 30, 2008.
U.S. Appl. No. 11/418,091 - Jul. 30, 2007 PTO Office Action.
U.S. Appl. No. 11/418,091 - Nov. 27, 2007 Response to PTO Office Action of Jul. 30, 2007.
U.S. Appl. No. 11/418,091 - Feb. 26, 2008 PTO Office Action.
U.S. Appl. No. 11/418,097 - Jun. 2, 2008 PTO Office Action.
U.S. Appl. No. 11/418,097 - Dec. 2, 2008 Response to PTO Office Action of Jun. 2, 2008.
U.S. Appl. No. 11/418,097 - Feb. 18, 2009 PTO Office Action.
U.S. Appl. No. 11/418,099 - Jun. 23, 2008 PTO Office Action.
U.S. Appl. No. 11/418,099 - Dec. 23, 2008 Response to PTO Office Action of Jun. 23, 2008.
U.S. Appl. No. 11/418,100 - Jan. 12, 2009 PTO Office Action.
U.S. Appl. No. 11/418,123 - Apr. 25, 2008 PTO Office Action.
U.S. Appl. No. 11/418,123 - Oct. 27 2008 Response to PTO Office Action of Apr. 25, 2008.
U.S. Appl. No. 11/418,123 - Jan. 26, 2009 PTO Office Action.
U.S. Appl. No. 11/418,124 - Oct. 1, 2008 PTO Office Action.
U.S. Appl. No. 11/418,124 - Feb. 2, 2009 Response to PTO Office Action of Oct. 1, 2008.
U.S. Appl. No. 11/418,124 - Mar. 13, 2009 PTO Office Action.
U.S. Appl. No. 11/418,126 - Oct. 12, 2006 PTO Office Action.
U.S. Appl. No. 11/418,126 - Feb. 12, 2007 Response to PTO Office Action of Oct. 12, 2006 (Redacted).
U.S. Appl. No. 11/418,126 - Jun. 6, 2007 PTO Office Action.
U.S. Appl. No. 11/418,126 - Aug. 6, 2007 Response to PTO Office Action of Jun. 6, 2007.
U.S. Appl. No. 11/418,126 - Nov. 2, 2007 PTO Office Action.
U.S. Appl. No. 11/418,126 - Feb. 22, 2008 Response to PTO Office Action of Nov. 2, 2007.
U.S. Appl. No. 11/418,126 - Jun. 10, 2008 PTO Office Action.
U.S. Appl. No. 11/418,127 - Apr. 2, 2009 PTO Office Action.
U.S. Appl. No. 11/418,128 - Dec. 16, 2008 PTO Office Action.
U.S. Appl. No. 11/418,128 - Dec. 31, 2008 Response to PTO Office Action of Dec. 16, 2008.
U.S. Appl. No. 11/418,128 - Feb. 17, 2009 PTO Office Action.
U.S. Appl. No. 11/418,129 - Dec. 16, 2008 PTO Office Action.
U.S. Appl. No. 11/418,129 - Dec. 31, 2008 Response to PTO Office Action of Dec. 16, 2008.
U.S. Appl. No. 11/418,244 - Jul. 7, 2008 PTO Office Action.
U.S. Appl. No. 11/418,244 - Nov. 25, 2008 Response to PTO Office Action of Jul. 1, 2008.
U.S. Appl. No. 11/418,263 - Sep. 24, 2008 PTO Office Action.
U.S. Appl. No. 11/418,263 - Dec. 24, 2008 Response to PTO Office Action of Sep. 24, 2008.
U.S. Appl. No. 11/418,263 - Mar. 9, 2009 PTO Office Action.
U.S. Appl. No. 11/418,315 - Mar. 31, 2008 PTO Office Action.
U.S. Appl. No. 11/418,318 - Mar. 31, 2009 PTO Office Action.
U.S. Appl. No. 11/441,219 - Jan. 7, 2009 PTO Office Action.
U.S. Appl. No. 11/522,929 - Oct. 22, 2007 PTO Office Action.
U.S. Appl. No. 11/522,929 - Feb. 21, 2008 Response to PTO Office Action of Oct. 22, 2007.
U.S. Appl. No. 11/641,678 - Jul. 22, 2008 PTO Office Action.
U.S. Appl. No. 11/641,678 - Jan. 22, 2009 Response to PTO Office Action of Jul. 22, 2008.
U.S. Appl. No. 11/711,000 - Mar. 6, 2009 PTO Office Action.
U.S. Appl. No. 11/716,552 - Feb. 12, 2009 Response to PTO Office Action of Feb. 2, 2009.
U.S. Appl. No. 11/716,552 - Jul. 3, 2009 PTO Office Action.
Walsh, J.E., et al., 1999, From website: http://www.ieee.org/organizations/pubs/newsletters/leos/feb99/hot2.htm.
Wentworth, Stuart M. et al., "Far-Infrared Composite Microbolometers," IEEE MTT-S Digest, 1990, pp. 1309-1310.
Whiteside, Andy et al., "Dramatic Power Savings using Depressed Collector IOT Transmitters in Digital and Analog Service."
Yamamoto, N. et al., "Photon Emission From Silver Particles Induced by a High-Energy Electron Beam," Physical Review B, Nov. 6, 2001, pp. 205419-1-205419-9, vol. 64, The American Physical Society.
Yokoo, K. et al., "Smith-Purcell Radiation at Optical Wavelength Using a Field-Emitter Array," Technical Digest of IVMC, 2003, pp. 77-78.
Zeng, Yuxiao et al., "Processing and encapsulation of silver patterns by using reactive ion etch and ammonia anneal," Materials Chemistry and Physics 66, 2000, pp. 77-82.

* cited by examiner

170f

PLASMON WAVE PROPAGATION DEVICES AND METHODS

CROSS-REFERENCE TO CO-PENDING APPLICATIONS

The present invention is related to and claims priority to the following co-pending U.S. patent applications:
(1) U.S. Provisional Application Ser. No. 60/801,405, filed May 19, 2006;
(2) U.S. Provisional Application Ser. No. 60/800,043, filed May 15, 2006; and
(3) U.S. Provisional Application Ser. No. 60/812,109, filed Jun. 9, 2006.

The entire contents of those applications are incorporated herein by reference. This application further is related to and incorporates by reference:
(1) U.S. patent application Ser. No. 10/917,511, filed Aug. 13, 2004,
(2) U.S. patent application Ser. No. 11/203,407, filed Aug. 15, 2005, and
(3) U.S. patent application Ser. No. 11/410,924, Apr. 26, 2006.

FIELD OF INVENTION

The application is directed to the production of electromagnetic radiation through the use of a charged particle beam.

SUMMARY OF THE BACKGROUND

The field of vacuum microelectronics (VME) is directed to the miniaturization of vacuum tubes and other structures. In such devices, charged particles, e.g., electrons, flow within a vacuum environment between a cathode and an anode. In VME environments, electrons travel without scattering and are easily manipulated. (The rest mass of an electron is only $9.11 \times 10^{-32}$ kg.) Thus, those devices can operate at high frequencies, and little if any heat is generated by the flow of electrons. Early vacuum tubes were developed to generate devices operating at 13 MHz. The speed of many vacuum tubes, has been traditionally limited by two factors. The first is capacitive damping of the applied biases on the plates and feed throughs into the glass envelope, or in the case of MEMS based devices, the leads into and out of the device. This issue was solved for large conventional tubes in part by utilizing resonant cavities to self-bias the tube at the resonant frequency of the cavity. The space-charge of the electron beam induces an electric field, and in turn, a current which travels around the cavity. The velocities of the electrons in the beam are influenced by these space-charge induced oscillating fields, making a tendency for the electrons to bunch up. This bunching in beam current intensifies to a maximum at some later time, and the resulting space-charge wave is coupled out to provide power at the resonant frequency of a cavity. The use of these resonant structures to avoid coupling high frequency signals through capacitively leaky feedthroughs increases the available oscillation frequencies to a regime where the second limiting factor becomes important. In large-scale tubes, the maximum frequency is limited by the resistance of the material from which the cavity is made. Since the resistivity of the materials being used generally increases with frequency through the gigahertz range, the frequency of operation is limited by resistive losses as a result of the currents flowing in the resonant structures. In addition, as the frequency increases, the size of the cavity becomes more difficult to manufacture by conventional means.

Known commercially used light generation techniques are very inefficient. Incandescent lamps (e.g., with tungsten filaments) waste greater than 90% of their energy in the generation of heat and infra-red electromagnetic radiation. Quartz lamps are twice as efficient as tungsten filament lamps (which are 40× better light emitters than candles).

In addition to incandescent lights, there are other sources of light. Fluorescent lights contain low pressure mercury vapor in a phosphor-coated glass tube which has electrodes at each end. When a current is applied across the electrodes, the electrons collide with and ionize the mercury vapor. The ionized mercury vapor emits some light in both visible and ultraviolet ranges. The visible light is emitted directly, while the ultraviolet light is absorbed by a phosphor and re-emitted as visible light. Because a greater fraction of the energy is consumed by light production rather than heating, fluorescent lights are more efficient than incandescent lights. The inside of the glass is coated with a phosphor, a material that is fluorescent. Phosphors absorb high-energy photons, and emit the light as lower energy photons; in this case, they absorb light in the ultraviolet range, and re-emit it as visible light. This can be explained by the fact that some of the electrons of the phosphor do not immediately drop all the way to their ground state, but relax to an intermediate state before dropping to ground state.

The second type of light is a sodium or neon-type light. These are filled with a particular gas at low pressures. Electric current passed through the gas causes electrons of the individual gaseous molecules to jump to higher energy states. They then decay to their normal state, emitting light of a characteristic wavelength: sodium lights are yellow, neon is red, and so on. Some elements, like sodium, give a single, very intense line when the light is passed through a prism to separate the colors (sodium lamps are 6-8× more efficient than incandescent lamps, because nearly all of their light is a single frequency rather than the mixture found in incandescent lamps). Other elements, such as helium or neon, give a series of lines when the light is passed through a prism, some of which are in the ultraviolet region; the characteristic color of these gases is determined by the combination of the relative intensities of the various bands.

LED (light emitting diode) technology has made recent gains beyond basic display applications to achieve use in low-end illumination applications (flashlights, automobile tail lights, etc.), but with great improvement in reliability over prior filament-based lamps. Economies of scale have continued to make the technology increasingly affordable. The basic mechanism of light emission in LEDs is the combination of electrons and holes to generate a photon. Because electrons must move through the semiconductor material, energy is lost as electrons collide with the bulk of the material.

Previously, light production in semiconductors suffered from several problems, including: (1) the inability of standard silicon-based processes to produce light directly, and (2) functional light emitting devices in production often use exotic and non-silicon materials (e.g., Group II-V materials) to produce light. These materials are generally not compatible with the production of highly integrated devices—such as microprocessors—due to cost and yield issues that cannot be cost effectively eliminated. Thus, the vast majority of chips that are produced today use standard silicon technology and suffer from the lack of light emitting devices.

GLOSSARY

As used throughout this document:

The phrase "ultra-small resonant structure" shall mean any structure of any material, type or microscopic size that by its characteristics causes electrons to resonate at a frequency in excess of the microwave frequency.

The term "ultra-small" within the phrase "ultra-small resonant structure" shall mean microscopic structural dimensions and shall include so-called "micro" structures, "nano" structures, or any other very small structures that will produce resonance at frequencies in excess of microwave frequencies.

BRIEF DESCRIPTION OF THE DRAWINGS

The following description, given with respect to the attached drawings, may be better understood with reference to the non-limiting examples of the drawings, wherein:

FIG. 2b is a graph of logic levels representing bias voltages applied to the data deflection plates and the frequency deflection plates to achieve the deflection of FIG. 2a;

FIG. 3b is a graph of logic levels representing bias voltages applied to the frequency deflection plates to achieve the deflections of FIG. 3a;

DISCUSSION OF THE PREFERRED EMBODIMENTS

Figure 1:
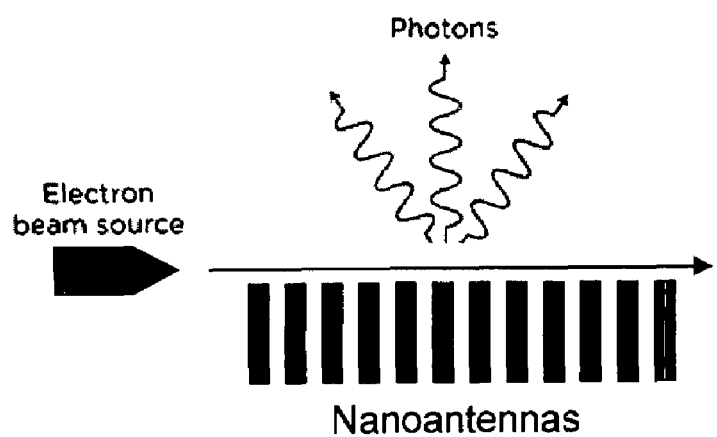
FIG. 1 is a conceptual diagram of a charged particle beam interacting with nanoantennas to produce electromagnetic radiation.

Turning to FIG. 1, a conceptual diagram of a charged particle beam interacting with ultra-small resonant structures called nanoantennas to produce electromagnetic radiation is shown. The nanoantennas are formed on a substrate (e.g., silicon) and generate light based in large part on the periodicity of the "fingers" that make up the nanoantennas. The individual fingers have typical dimensions of less than 100 nanometers on the shorter side and typically between 100 and 500 nanometers on the longer side. The nominally less than 0.5 micron long individual fingers are sized optimally to match the desired electron energy. The overall group is typically 1 to 10 microns long. The electron velocity is typically 30 keV. The full-width, half-max (FWHM) of the emission spectrum is typically 20 nm with 18 nm being a typical low-end.

The charged particle may be an electron beam or any other source of charged particles. By utilizing fine-line lithography on the surface of the substrate, the nanoantennas can be formed without the need for complicated silicon devices.

Engineers have been trying to get silicon to emit light since the early days of solid-state displays and optical communications, in hopes of integrating optical and logic circuits on a single silicon chip. Doing so would eliminate the need for a separate device, typically composed of some form of gallium arsenide, to generate light, thus reducing system size, power and cost.

In the configuration of FIG. 1, a charged particle beam (e.g., an electron beam) is directed across the surface of a substrate (e.g., one or more silicon-based chips). Such a charged particle may include particles that were accelerated by a high-voltage bias source, much as an electron gun in a cathode-ray tube accelerates electrons to affect the phosphors. An electron beam can be generated by a lateral field-emission tip, biased at about −20 kV, for example. Such tips would typically be fabricated on the chip, with one or more per antenna array. Since tips can wear out, multiple tips can be fabricated and then switched, so that a new tip goes into use as its predecessor deteriorates below a predetermined level. The electrons can travel without scattering and are easily manipulated.

On the chip surface, one or more arrays of nanoantennas of specific height and spacing are fabricated (e.g., using standard lithographic and etch and/or deposition technology). When the e-beam passes near the antenna array, the electrons in the beam can accelerate electrons in the plasmon states of the nanoantennas. These plasmons can further interact back with the beam and with nearby nanoantennas to reinforce the plasmons, ultimately leading to generation of photons, thus creating light, as shown in FIG. 1. The effect of electron charge density waves in the nanoantennas will be referred to herein as plasmon wave propagation.

Plasmons in plasmon wave propagation are a physics phenomenon based on the optical properties of metals. They are represented by the energy associated with charge density waves propagating in matter through the motions of large numbers of electrons. Electrons, in a metal, screen an electric field. Light of a frequency below the plasma frequency is reflected. Electrons cannot respond fast enough to screen above the plasma frequency, and so such light is transmitted. Most metals tend to be shiny in the visible range, because their plasma frequency is in the ultraviolet. Metals such as copper have their distinctive color because their plasma frequency is in the visible range. The plasma frequency of doped semiconductors is generally in the infrared range.

Those plasmons that are confined to surfaces and which interact strongly with light are known as surface plasmons. The interface between a conductor and an insulator is where surface plasmons propagate. Bound to the surface between the two, the magnitudes of the fields associated with the surface plasmons exponentially decay into both media.

Metallic nano-particles can exhibit strong colors due to plasmon resonance, which is the phenomenon that gives some stained glass its color. The strong pure colors of medieval stained glass windows are sometimes ascribed to the impurities of the glass. However, metals or metallic oxides are what actually give glass color: gold gives a deep ruby red; copper gives blue or green, iron gives green or brown, and so forth. Plasmons on the surface of the gold nano-particles (i.e. at the interface with the glass) move such that they absorb blue and yellow light but reflect the longer wavelength red to give the glass a characteristic ruby color. The same is true of the other metals/metal oxides, insofar that they selectively absorb some wavelengths, but reflect others.

There have been a number of studies showing the resonant interaction of nanoscale materials, in which the nanoscale structures resonate with the oscillations from the photons absorbed. These nano-structures resonate at particular frequencies determined by size, shape, and material properties, in much the same way that some acoustic systems or electrical antennas resonate at a given set of frequencies. These nano-structures have been studied by using lasers, and in fact, the paper entitled "A solution-processed 1.53 µm quantum dot laser with temperature-invariant emission wavelength," Optics Express 14, 3275 (2006), by S. Hoogland, V. Sukhovatkin, I. Howard, S. Cauchi, L. Levina, E. H. Sargent, has recently shown the resonance lasing of nanoscale particles. However, for practical applications, in many areas, it is highly desirable to have the resonance and subsequent light emission be stimulated by an electrical means, allowing integration of light sources to electronics. There have not been any successful devices made in which the electrical stimulation of resonance of nanoscale structures results in the emission of light.

Nanoantenna arrays, such as shown in FIGS. 1 and 2a, 2c and 3a can be configured to create any specific wavelength or combination of wavelengths of light. Furthermore, light emission is independent of the bulk material, and no diodes or transistors need be used in the display portion. Logic and some high-voltage circuits, however, can be used to drive the control elements that switch the beam on and off and steer it across the surface (e.g., to selectively excite various nanoantenna arrays, potentially each producing a different frequency of electromagnetic radiation (some of which may be visible light)). Special nanometer-sized control elements, can also be fabricated on the surface of the silicon. By applying the proper bias (typically about 10 volts) and timing on those elements, the electron beam can be deflected or blocked. Thus, a single beam can be used to excite multiple nanoantenna arrays to create characters, images for displays or just single points of light for chip-to-chip communications.

The optical devices can operate at high frequencies, such as with switching times better than $10^{-13}$, and can generate light with a frequency range from far infrared to ultraviolet, and even x-ray. Typical wavelengths can include 400 nm to 700 nm, although, as described above, other wavelengths are possible. Plasmon wave propagation devices as described herein can operate at 750 THz.

In addition to reducing the size and cost of semiconductor devices, this technique allows system designers to create simple inter- and intra-chip communications systems, or even inter- or intra-board links, with reduced overhead. Additional applications can include clock broadcast schemes, distributed computing systems, short-haul networking, secure networks, displays and printers. In fact, a myriad of potential applications exist for this new technology, including but not limited to; lighting (e.g., room lighting), displays, communications, optical computing, optical amplification, spectroscopy and fiber-optic communications.

Nanolithographic techniques are used to construct the antenna arrays. The efficiency of the light generation is mostly determined by the effectiveness of the harvesting of the energy of the e-beam by the nanoantenna arrays. It appears that the plasmon wave propagation scheme is several times more efficient than fluorescent lamps or LEDs and does not require a bandgap material. Moreover, the unharvested energy from the electron beam can be recovered and recycled. Also, the nanoarrays do not require quantum dots or phospors as in other light generating techniques.

In one embodiment, a single electrodeposited metal layer of silver is used to create the nanoantenna array, and the periodicity of the antenna elements controls the light frequency. The antennas are typically 100 nm high, and, when fabricated using lithographic tools targeted for 90- and 65-nm features, antennas with a pitch of 155 to 250 nm can be created. Each antenna might be 60 to 180 nm long and at least 30 nm thick (or up to 90 percent of the pitch). A basic linear array of antennas might be several microns long, but depending on the light output and shape, the antenna array can be configured in many patterns—linear, rectangular, square and so on.

Figure 2A:
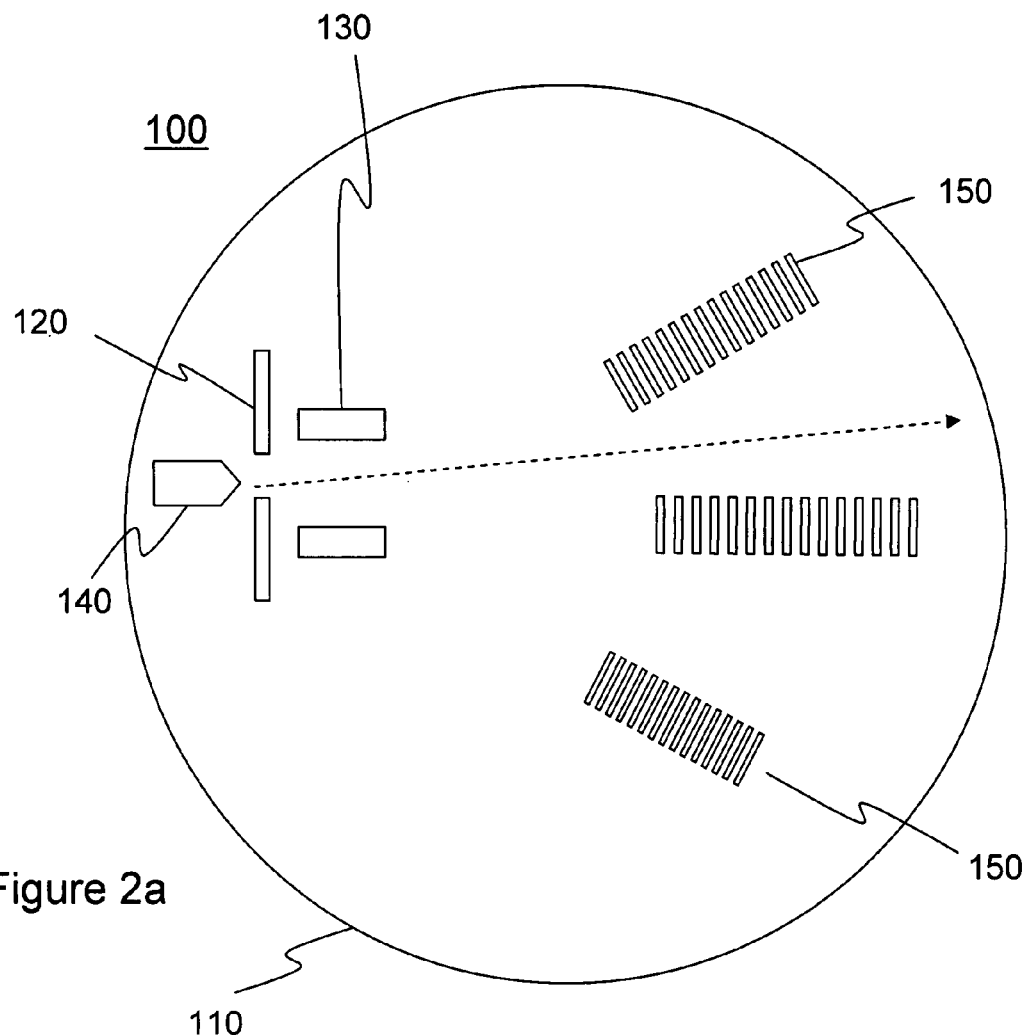
FIG. 2a illustrates a charged particle beam being selectively deflected such that no electromagnetic radiation frequency is emitted.
Figure 2B:
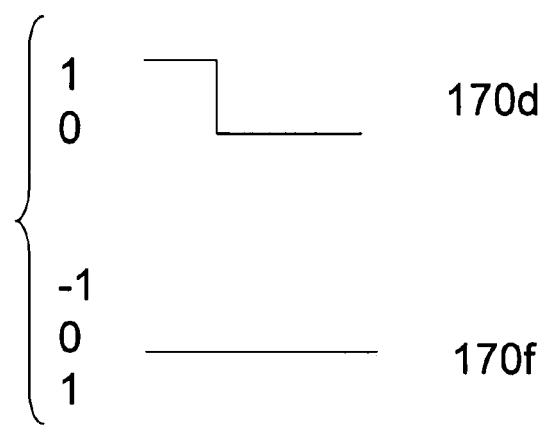

Multiple arrays, each with a different light frequency, can be fabricated on a single substrate. That substrate can be any integrated circuit, but of high interest are the highly integrated submicron CMOS ICs. For example, as shown in FIG. 2a, a light emitting system 100 includes nanoantenna arrays 150 fabricated on a substrate 110 (such as a silicon wafer). The charged particle source 140 (such as an electron source) passes through a set of data deflection plates 120 that are biased by a biasing voltage (as represented by a logic level of "1" in FIG. 2b with reference to reference numeral 170d). Due to their biasing, the data deflection plates deflect the charged particle beam away from any of the nanoantenna arrays 150, thus the system 100 emits no electromagnetic radiation. At the same time, the frequency deflection plates 130 are unbiased (as represented by a logic level of "0" in FIG. 2b with reference to reference numeral 170f).

Figure 2C:
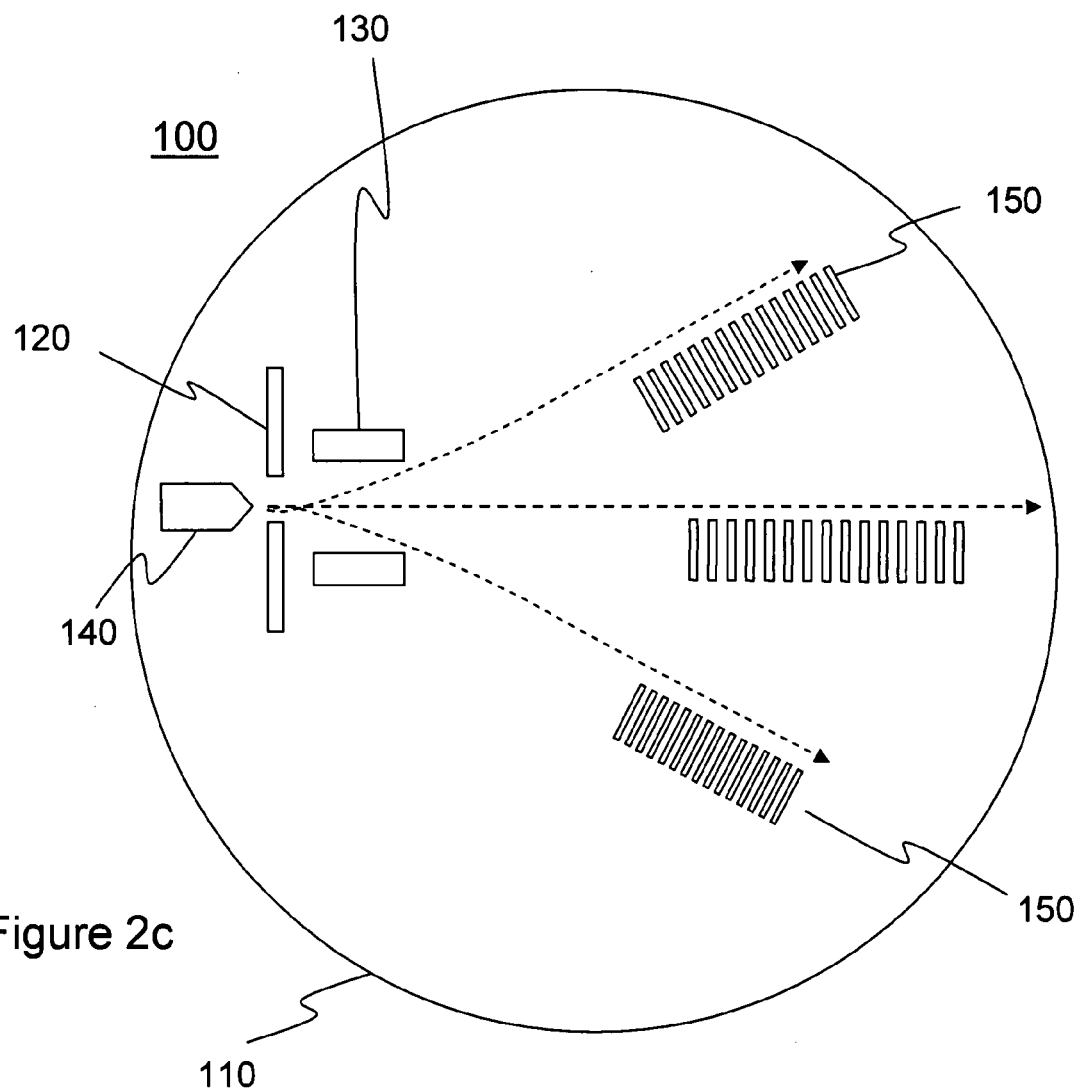
FIG. 2c illustrates a charged particle beam being selectively deflected to one of the nanoantenna arrays such that a corresponding electromagnetic radiation frequency is emitted.
Figure 2D:
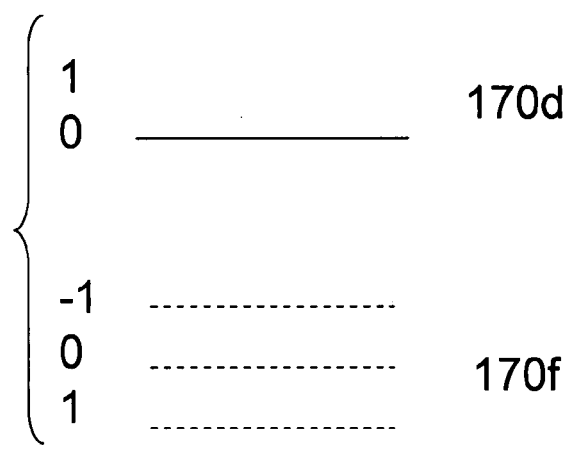
FIG. 2d is a graph of logic levels representing bias voltages applied to the data deflection plates and the frequency deflection plates to achieve the deflections of FIG. 2c.

As shown in FIGS. 2c and 2d, the data deflection plates 120 remain unbiased (as represented by a logic level of "0" in FIG. 2d with reference to reference numeral 170d) and do not deflect the charged particle beam. Instead, the frequency deflection plates 130 are biased so as to direct the charged particle beam toward the desired one of the nanoantenna arrays 150 which produces the desired frequency. This bias may be no bias (such that the beam goes straight ahead), a negative bias, or a positive bias (each represented by a dashed line in FIG. 2d with respect to reference numeral 170f). By varying the data deflection and frequency deflection signals, the nanoantennta arrays can emit either no electromagnetic radiation (EMR) or EMR at at least one desired frequency.

Figure 3A:
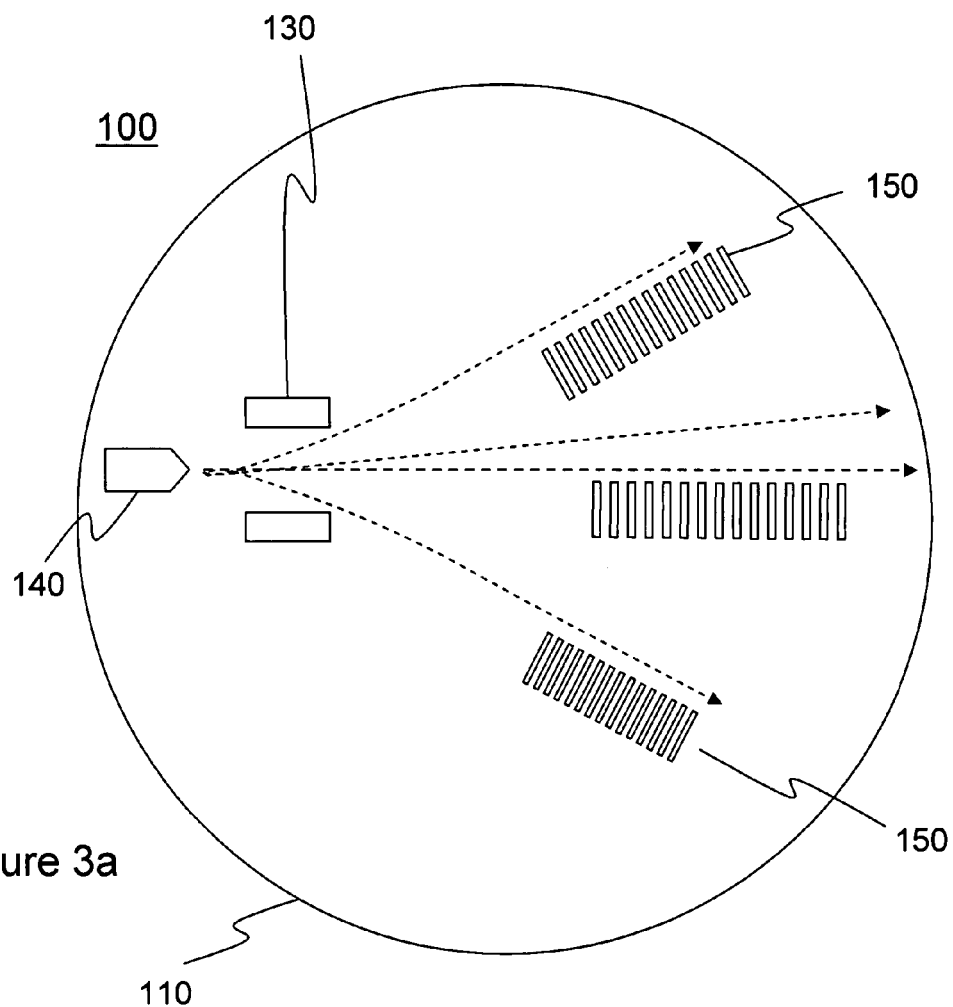
FIG. 3a illustrates a charged particle beam being selectively deflected to one or none of the nanoantenna arrays such that a corresponding electromagnetic radiation frequency, if any, is emitted.
Figure 3B:

Alternatively, as shown in FIGS. 3a and 3b, the data deflection plates and the frequency deflection plates can be combined into a single set of plates that perform both data and frequency deflections by deflecting the beam away from any of the nanoantenna arrays when no data (or EMR) signal is to be emitted, and by deflecting the beam to a corresponding nanoantenna array when a corresponding data (or EMR) signal is to be emitted. While not illustrated, focusing elements may be used to direct the beam along certain paths. The system 100 also utilizes vacuum packaging which helps reduces electron scattering. Also, while the logic levels are indicative of relative biases, it should be noted that high-voltage sources can be used in the system 100.

Although the charged particle beam is described above as deflected by the data deflection plates and the frequency deflection plates, it is also possible to deflect the charged particle beam using the nanoantenna arrays themselves. For example, the nanoantenna arrays could be DC biased such that they repel the charged particles and prevent the nanoantenna arrays from resonating. Furthermore, the DC bias may be applied to one or more of the nanoantenna arrays simultaneously. Alternatively, one or more DC biases could be applied to help focus and/or attract the beam.

Many traditional ICs have limited high-speed I/O ports, and through the incorporation of nanoantenna arrays, the surface of the chip can be used as an additional I/O resource. Antenna arrays interspersed with optical receivers could form free-space high-speed optical links with a nearby chip or be used to drive a Raman laser.

Unlike compound semiconductors, which degrade over time due to heat or other material changes, the antennas used in the plasmon wave propagation technology have no degradation mechanism, and the electron beam generates no heat, thus potentially making the technology very reliable. Some of that reliability may depend on the supporting infrastructure (power supplies, electron source, etc.).

Thus, by bridging the growing gap between the massive computing power of leading-edge microprocessors and the ability to quickly move data on and off chip, plasmon wave propagation will support both current and future generations of integrated circuits.

With speeds more then a thousand times faster than conventional on-chip wiring, plasmon wave propagation's optical-based technology will support data rates substantially higher than those achieved by current copper interconnect technologies used in today's integrated circuits. Plasmon wave propagation enables these massive data rates through EMR (e.g., light) emission devices that are directly interfaced to and between integrated circuits, printed circuit boards, and local area networks. This massive increase in available bandwidth will create new and unprecedented applications by bringing optics-based data communications to the chip and the desktop computing environment. In addition, there is also the potential to use light for future intra-chip transport of signals and clocks within a single integrated circuit. This can help address one of the most demanding aspects of modern chip design-clock skew.

Emitter Devices have been designed, fabricated, and tested to show that different and multiple modes can be achieved in one device at the same time. Multiple frequency devices can be built on one chip at the same time, and in the same layer such that the devices emit selective frequencies of light.

High emitter switching speeds (e.g., 130 MHz MEM) are possible, and the availability of high-speed, commercial detectors may be a limiting economic factor.

Plasmon wave propagation will support both current and future generations of microprocessors and will reduce the growing gap between the ever-increasing computing power of leading-edge microprocessors and the inability to quickly move data on and off chip. This represents a new method for producing electrically stimulated light throughout the entire terahertz spectrum, and, potentially into the petahertz spectrum, without utilizing electronic transitions, but rather generating the light from plasmon oscillations in the antennae and/or oscillations in the trajectory of the electrons in the beam. This allows, for example, emission at multiple wavelengths from devices formed in a single layer, with a single material.

When designing a resonant structure of any type, one must consider the nature of the oscillation, as well as the size of the structure in relation to the speed of the oscillation. Nano-antenna arrays utilize oscillations in the "electron sea" of a metal, commonly known as plasmon resonance. Typically, plasmons at the interface of a metal and a dielectric, known as surface-plasmons, are lower in energy than bulk plasmons, thus the electron density waves tend to travel primarily along surfaces. If a structure is designed in such a way that these plasmons can travel around the surface of a particle, reflect from edges, or otherwise become "re-entrant," then the structure will have a plasmon resonance at the frequencies determined by the plasmon velocity as well as the size and shape of the structure. From a macroscopic electrical viewpoint, the effect of these resonant plasmons is that the effective resistance at the plasmon frequencies are reduced greatly from what would be expected from extrapolation of the typical increase in the resistivity of a metal with increasing frequency. The utilization of plasmon resonance allows for the operation of resonance-based vacuum microelectronics in the optical frequency regime. This reduction in effective resistance, coupled with the ability of modern fabrication and lithography techniques such as electron-beam lithography and nano-imprinting have allowed fabrication of nano-antenna arrays which interact with an electron beam to form a light-emitting, self-synchronizing resonant system that emits light at any wavelength or combination of wavelengths, limited only by the size and shape of the antennae, and the energy of the electrons.

Figure 4:
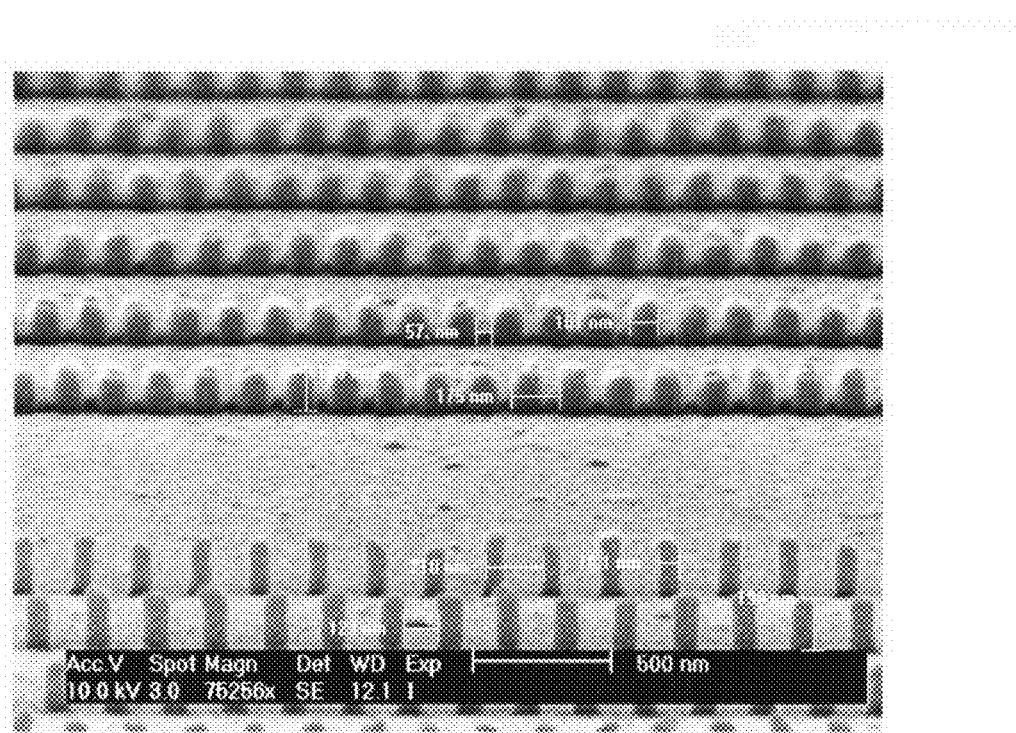
FIG. 4 is a SEM image of exemplary resonant structures for use with the techniques described herein.

FIG. 4 shows an SEM micrograph of several of the nano-antenna arrays. Each device consists of an array of antennae which are spaced according to the wavelength of light desired and the electron energy according to the following formula observed normal to the array:

$$\lambda = \frac{l}{|n|\beta},$$

where l=period of structures or "fingers", $\beta$=v/c, c=speed of light, and n=the mode number.

The above equation describes the oscillation in electron trajectory due to the periodic interactions with the metal antennae and does not necessarily imply a true resonance condition involving internal plasmon resonance on the antennae, since there is no antenna geometrical term. It should be noted that the equation for the spacing between antennae is a function of the electron energy through the velocity of the electron. This effect can be seen in antenna arrays with 155 nm spacing. In these devices, changing the electron energy from 30 keV to 25 keV shifts the peak wavelength from 445 nm to 490 nm. This mechanism for emission is somewhat like that of a free electron laser, although there is no pre-bunching of electrons in the devices. In this simplest non-resonant form, the structure simply acts as a means by which the electron is accelerated in an oscillatory fashion. Typically an alternating DC bias or alternating magnetic field would be used for conventional devices of this nature.

Figure 5A:
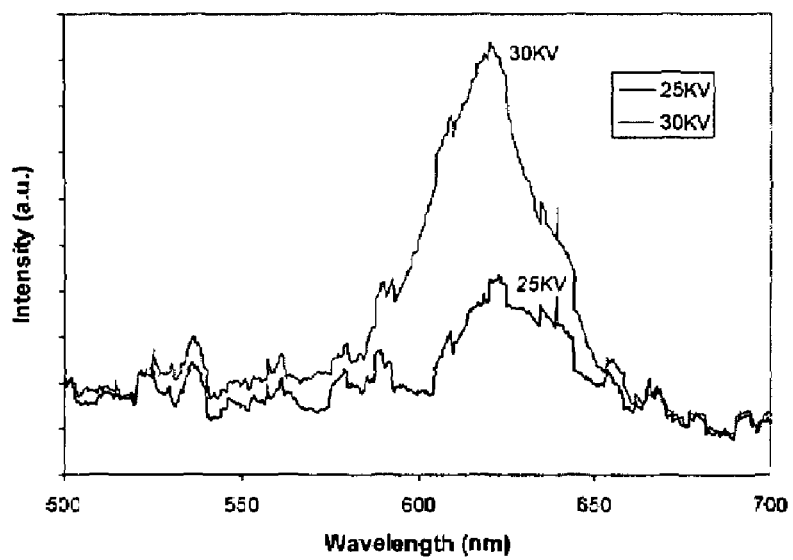
FIG. 5a is an emission graph showing a first emission mode where emitted wavelength is independent of electron velocity.
Figure 5B:
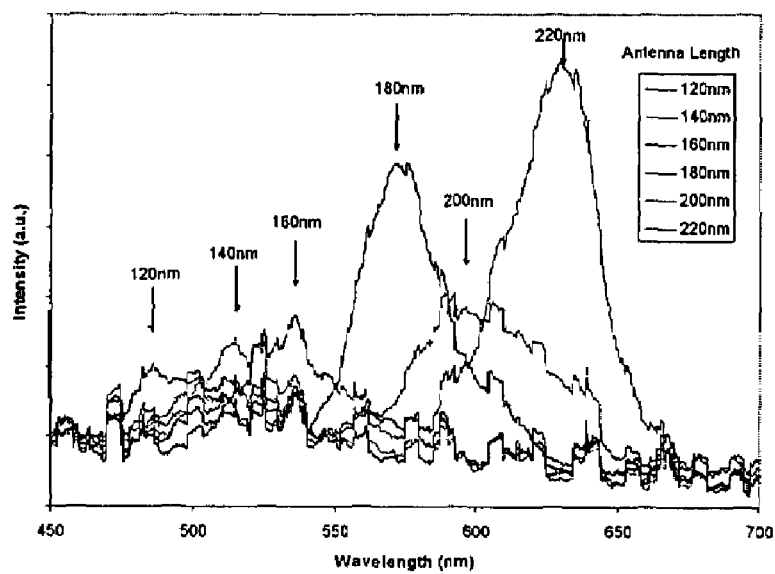
FIG. 5b is an emission graph showing a second emission mode where emitted wavelength is dependent on antenna length.

These devices also exhibit a second set of emission modes which is due to the plasmon resonance on the antennae. Unlike the light emitted from the free electron oscillations, the wavelength produced from this plasmon mode is independent of the electron velocity (FIG. 5a). The wavelength of light emitted from this geometric-dependant plasmon mode is, however, dependant on the size of the resonant antennae. As can be seen in FIG. 5b, the wavelength of the output of this mode of the antenna array is a strong function of the length of the individual antennae. This is evidence that plasmon resonance is a source of the light emission.

It appears that the mechanism of operation of these devices is as follows. As an electron approaches an antenna, it will experience a force due to the charge density on the antenna at that time causing acceleration of the electron. The charge of the electron also exerts a force on the surface charges of the antenna. The redistribution of surface-charge is also thought to generate or reinforce surface-plasmons that travel, producing a wave of charge analogous to the currents generated in a conventional resonant-cavity. The system is designed in such a way that surface-charge waves on one antenna will be coupled to the adjacent antennae. Thus there is an effective "feedback" between the modified electron trajectory by way of this direct coupling and the adjacent antennae. If the velocity of the electron or the size of the antennae is such that the electron reaches the next structure when the surface-plasmon wave is out of phase with the first, then the electron will experience opposite acceleration as it passes adjacent antennae. This plasmon will be enhanced at that point due to the repulsion of the charge of the free electron. This process will continue down the nano-antenna array with each successive antenna experiencing larger fields as the electron continues to interact in phase with the plasmons, and the antennae directly couple with one another to remain in phase.

Figure 6:
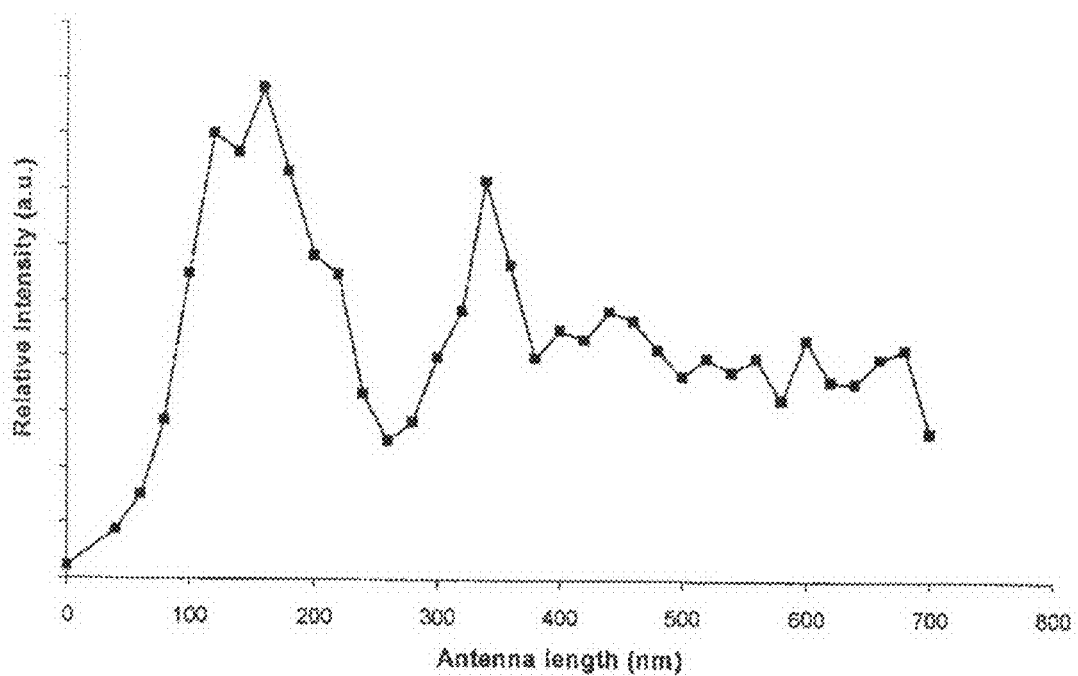
FIG. 6 is a graph showing intensity as a function of the antenna length with a fixed electron beam current and voltage.

In effect, such devices utilize a synergy between the electron and plasmon oscillations. For a given electron energy, the spacing and length of the antennae can be sized in such a way that the electron and plasmon resonance frequencies constructively interfere. This gives a self-synchronizing resonant condition in which the output of light is maximized. The results of one series of measurements representing intensity as a function of the antennae length with a fixed electron beam current and voltage is shown in FIG. 6. These results show a peak in the output intensity at about 170 nm and another at about 340 nm antenna length. These two peaks are consistent with electron beam resonance with the first and second order plasmon resonance modes of the antennae.

Devices described herein can be fabricated in a single layer of silver. The silicon substrate is first coated with a thin layer of silver which provides a conductive path for the electroplating of the devices. A layer of polymethyl methacrylate (PMMA) is spin coated from a 2% solution in chlorobenzene to a nominal thickness of 250 mn. The PMMA is then baked in air at 160° C. for 15 minutes, 110° C. for 20 minutes, or 180° for 15 min to remove the solvent. The lower temperature is used so as not to damage the underlining layer of silver. The sample is then patterned using e-beam lithography (J.C. Nabity systems Nanometer Pattern Generating System on an FEI XL-30 FE scanning electron microscope). After exposure, the PMMA pattern is developed in a 3:1 mixture of tert-isopropyl alcohol and methyl isobutyl ketone for 70 seconds and washed in isopropyl alcohol followed by distilled water. The pattern generated is such that there is a hole in the PMMA everywhere an antenna is to lie. The sample is placed in an electroplating bath (Caswell PNPS12) and the antennae are electroplated into the previously formed holes. After the electroplating, the remaining PMMA is removed using acetone. The following mixtures of PMMA:Chlorobenzene can also be used 1:1, 2:1, and 3:1, which would yield 50%, 66%, and 75% PMMA in each mixture respectively. The current one being used is the 3:1 mixture that is 75% PMMA. This gives us an estimated 300 nm thickness of PMMA. With no dilution (100% PMMA), Concentration-4 950 PMMA has a thickness of 400 nm where 950 refers to the molecular weight of the PMMA and the Concentration-4 refers to the type of a pre-made mixture. Other available types are Concentration-5 (500 nm), and Concentration-6 (600 nm). (PMMA in its various concentrations is commercially available from MicroChem of Newton, Mass. and described in its publication entitled "NANO PMMA and Copolymer", 2001, incorporated herein by reference.)

The thicknesses of the silver layers or any 'layers' mentioned can be varied and are not limited to the precise values described herein.

Devices can be tested using the electron beam from an FEI XL-30 FE scanning electron microscope. The microscope is equipped with a custom nano-positioning stage, a photomultiplier detector, and a fiber optic spectrometer (Ocean Optics USB2000). The sample is aligned to the beam so the electron beam can be passed along the side of the nano-antenna array or above it. The total intensity can be measured with the photomultiplier, and the spectroscopic information is obtained from the spectrometer. The electron beam current can be measured with a Faraday cup built into the sample holder, while the relative intensity measurements were corrected for beam current drift.

Figure 7:
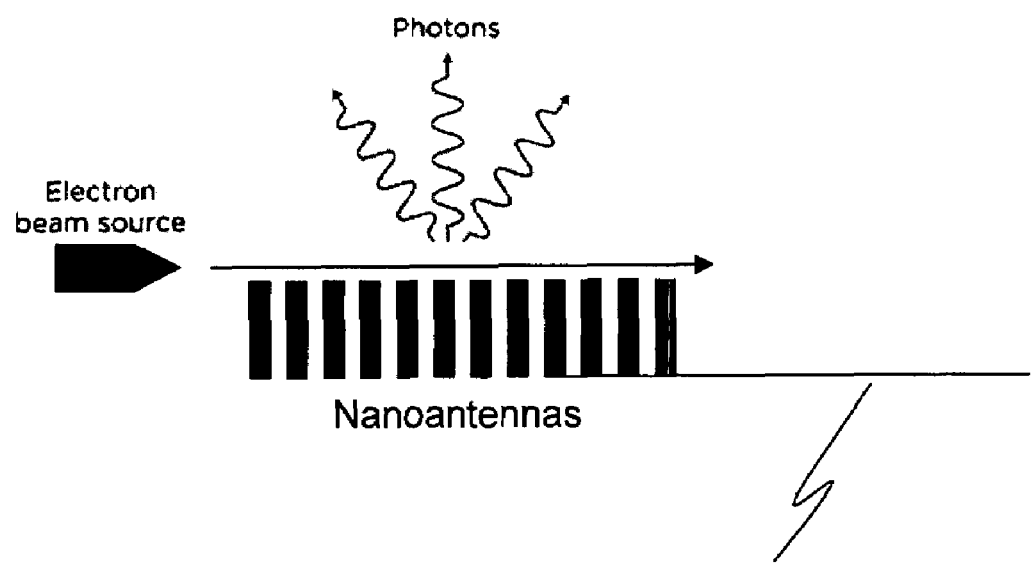
FIG. 7 is a conceptual diagram of a charged particle beam interacting with nanoantennas to produce plasmons that are coupled to a plasmon wire.

Plasmons have a variety of potential uses. One potential use of plasmons is in signal transmission using "plasmon wires." Plasmon wires are conductive wires or traces along which plasmons can travel. As shown in FIG. 7, a nanoantenna structure (acting as a transmitter) can be coupled to a wire or trace 700 such that plasmons induced by the charged particle source on the nanoantenna propagate down the wire or trace 700. At the receiver end, the plasmons on the wire or trace 700 are used to induce fields on a receiver nanoantenna such that the signal (in the form of a plasmon) that was transmitted down the wire/trace 700 can be detected. Plasmon wires can be much thinner than conventional wires, and could support much higher frequencies, so plasmons may be considered as a means of transmitting information on computer chips.

The extremely small wavelengths of plasmons mean that they could be utilized in high resolution lithography and microscopy. Surface-plasmon-based sensors can find uses in gas sensing, biological environments such as immuno-sensing and electrochemical studies. There are currently commercially available in some of these applications.

While the above-description has been given in terms of using silver as a material for the resonant structures, other materials are possible. One such material is nanotubes.

While certain configurations of structures have been illustrated for the purposes of presenting the basic structures of the present invention, one of ordinary skill in the art will appreciate that other variations are possible which would still fall within the scope of the appended claims.

The invention claimed is:

1. An electromagnetic transmitter comprising:
    a source of charged particles being emitted in a beam;
    a data input for receiving data to be transmitted;
    a first resonant structure configured to be excited by particles emitted from the source of charged particles and configured to emit electromagnetic radiation at a first predominant frequency representing the data to be transmitted, wherein the first predominant frequency has a frequency higher than that of a microwave frequency; and
    a bias source for biasing the first resonant structure to deflect the charged particles away from the first resonant structure to reduce an amount of resonance imparted to the first resonant structure by the charged particles.

2. The electromagnetic transmitter as claimed in claim 1, wherein the charged particles emitted from the source of charged particles comprise electrons.

3. The electromagnetic transmitter as claimed in claim 1, further comprising:
    a second resonant structure configured to be excited by the charged particles and configured to emit electromagnetic radiation at a second predominant frequency, wherein the second predominant frequency has a frequency higher than that of a microwave frequency; and at least one deflector having a control terminal for selectively exciting the first and second resonant structures by the charged particles.

4. The electromagnetic transmitter as claimed in claim 3, wherein the bias source biases the first resonant structure without biasing the second resonant structure.

5. The electromagnetic transmitter as claimed in claim 3, wherein the bias source biases the first resonant structure and the second resonant structure simultaneously.

6. The electromagnetic transmitter as claimed in claim 3, wherein the at least one deflector comprises at least two deflectors, wherein the first deflector deflects the charged particles in a first direction and the second deflector deflects the charged particles in a second direction.

7. The electromagnetic transmitter as claimed in claim 3, wherein the first deflector and second deflectors are on opposite sides of the beam of charged particles.

8. The electromagnetic transmitter as claimed in claim 3, wherein the first deflector and second deflectors are on the same side of the beam of charged particles.

9. The electromagnetic transmitter as claimed in claim 1, further comprising a focusing element for focusing the charged particles along a path that causes the first resonant structure to resonate.

* * * * *